US009794649B2

(12) United States Patent
Denoual et al.

(10) Patent No.: US 9,794,649 B2
(45) Date of Patent: Oct. 17, 2017

(54) METHODS, DEVICES, AND COMPUTER PROGRAMS FOR STREAMING PARTITIONED TIMED MEDIA DATA

(71) Applicants: CANON KABUSHIKI KAISHA, Ohta-ku, Tokyo (JP); CANON EUROPE LIMITED, Uxbridge, Middlesex (GB)

(72) Inventors: Franck Denoual, Saint Domineuc (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/784,555

(22) PCT Filed: Apr. 9, 2014

(86) PCT No.: PCT/EP2014/057123
§ 371 (c)(1),
(2) Date: Oct. 14, 2015

(87) PCT Pub. No.: WO2014/170176
PCT Pub. Date: Oct. 23, 2014

(65) Prior Publication Data

US 2016/0080833 A1 Mar. 17, 2016

(30) Foreign Application Priority Data

Apr. 16, 2013 (GB) .................................. 1306899.4

(51) Int. Cl.
*H04N 7/173* (2011.01)
*H04N 21/845* (2011.01)
(Continued)

(52) U.S. Cl.
CPC ... *H04N 21/8456* (2013.01); *H04N 21/23439* (2013.01); *H04N 21/234327* (2013.01);
(Continued)

(58) Field of Classification Search
None
See application file for complete search history.

(56) References Cited

U.S. PATENT DOCUMENTS

2010/0299630 A1 11/2010 McCutchen et al.

FOREIGN PATENT DOCUMENTS

WO 2012168365 A1 12/2012

OTHER PUBLICATIONS

Amon et al., "File Format for Scalable Video Coding", IEEE Transactions on Circuits and Systems for Video Technology, vol. 17, No. 9, Sep. 2007, pp. 1-6.

(Continued)

*Primary Examiner* — William J Kim
(74) *Attorney, Agent, or Firm* — Canon USA, Inc. I.P. Division

(57) ABSTRACT

The invention relates to receiving, transmitting, and generating a manifest describing a plurality of versions of partitioned timed media data comprising timed samples that comprise subsamples. A portion of the data is transmitted as a media segment file comprising independently encapsulated components comprising partition components containing a subsample selected from among the plurality of subsamples of one of the timed samples and one corresponding subsample of the other timed samples and one reference component comprising at least one extractor identifying at least the partition component. The manifest comprises representations comprising at least a description of a version of a portion of the partitioned timed media data, one said representation comprising a description of components among which one component is required to reconstruct at least partially the partitioned timed media data and among (Continued)

which at least one component is an optional component that can be selected to reconstruct at least a portion of the partitioned timed media data.

10 Claims, 11 Drawing Sheets

(51) Int. Cl.
*H04N 21/2343* (2011.01)
*H04N 21/4728* (2011.01)
*H04N 21/643* (2011.01)
*H04N 21/84* (2011.01)
*H04N 21/854* (2011.01)

(52) U.S. Cl.
CPC ... *H04N 21/4728* (2013.01); *H04N 21/64322* (2013.01); *H04N 21/84* (2013.01); *H04N 21/85406* (2013.01)

(56) References Cited

OTHER PUBLICATIONS

Kofler et al., "Implications of the ISO Base Media File Format on Adaptive HTTP Streaming of H.264/SVC", 4th IEEE International Workshop on Future Multimedia Networking, 2012, pp. 1-3.
Thomas et al., "Spatially segmented content description", International Organisation for Standardisation ISO/IEC JTC1/SC29/WG11 MPEG2013/m28883, Coding of Moving Pictures and Audio, Apr. 2013, Incheon, South Korea, pp. 1-6.
Schierl et al., "System Layer Integration of High Efficiency Video Coding", IEEE Transactions on Circuits and Systems for Video Technology, vol. 22, No. 12, Dec. 2012, pp. 1-14.
Sodagar, Iraj, "The MPEG-DASH Standard for Multimedia Streaming Over the Internet", IEEE Computer Society, vol. 18, Issue 4, Apr. 2011, pp. 62-67.
Mavlankar et al., "An Interactive Region-of-Interest Video Streaming System for Online Lecture Viewing", Packet Video Workshop (PV), 2010 18th International, Hong Kong, Dec. 13-14, 2010, pp. 64-71.

METHODS, DEVICES, AND COMPUTER PROGRAMS FOR STREAMING PARTITIONED TIMED MEDIA DATA

CROSS-REFERENCE TO RELATED APPLICATIONS

The application is the National Phase application of PCT Application No. PCT/EP2014/057123, filed on Apr. 9, 2014. This application claims the benefit under 35 U.S.C. §119 (a)-(d) of United Kingdom Patent Application No. 1306899.4, filed on Apr. 16, 2013. The above cited patent applications are incorporated herein by reference in their entirety.

FIELD OF THE INVENTION

The invention generally relates to the field of timed media data streaming over communication networks, for example communication networks conforming to Internet Protocol (IP) standard. More particularly, the invention concerns methods, devices, and computer programs for streaming partitioned timed media data, in particular for streaming tiled timed media data over IP networks using the HyperText Transfer Protocol (http).

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits.

Streaming media data over a communication network typically means that the data representing a media presentation are provided by a host computer, referred to as a server, to a playback device, referred to as a client device, over the communication network. The client device is generally a media playback computer implemented as any of a variety of conventional computing devices, such as a desktop Personal Computer (PC), a tablet PC, a notebook or portable computer, a cellular telephone, a wireless handheld device, a personal digital assistant (PDA), a gaming console, etc. The client device typically renders a streamed content as it is received from the host (rather than waiting for an entire file to be delivered).

A media presentation generally comprises several media components such as audio, video, text, and/or subtitles that can be sent from a server to a client device for being jointly played by the client device. Those media components are downloaded by the client device from a server. A common practice aims at giving access to several versions of the same media component so that the client device can select one version as a function of its characteristics (e.g. resolution, computing power, and bandwidth).

Recently, the Moving Picture Experts Group (MPEG) published a new standard to unify and supersede existing streaming solutions over HTTP (HyperText Transfer Protocol). This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" that represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc), and depending on network conditions (e.g. available bandwidth). In the context of DASH standard, this manifest conforms to the extensible markup language (XML) standard.

Before a client device requests media data, it receives a MPD file so as to obtain a description of each accessible media segment and thus, request only the required media segments. In other words, by analyzing a received MPD file, a client device can obtain items of information of the accessible media segments of a media presentation, comprising, in particular, the addresses (e.g. http addresses) of the segments. Therefore, it can decide which media segments are to be downloaded (via HTTP requests), obtain these media segments, and play them after reception and decoding.

In addition to this association, the DASH standard proposes to split each media component into media sub-components according to small periods of time. The time decomposition is added in the MPD file. Accordingly, the MPD file provides links between http addresses (or URLs) and compact descriptions of each media segment over small periods of time, allowing a client device to download desired media segments of the media presentation over desired periods of time.

Since video resolution continuously increases, going from standard definition (SD) to high definition (HD), and to ultra-high definition (e.g. 4K2K or 8K4K), since not all receiving and video decoding devices have resources (e.g. network access bandwidth or CPU (Central Processing Unit)) to access video in full resolution, and since not all users need to access such video, it is particularly advantageous to provide the ability of accessing only some Regions of Interest (ROIs) that is to say to access only some spatial sub-parts of a whole video sequence.

A known mechanism to access spatial sub-parts of frames belonging to a video consists in organizing each frame of the video as an arrangement of independently decodable spatial areas generally referred to as tiles. Some video formats such as SVC (Scalable Video Coding) or HEVC (High Efficiency Video Coding) provide support for tile definition. A user-defined ROI may cover one or several contiguous tiles.

Accordingly, for streaming user-selected ROIs according to HTTP protocol, it is important to provide encapsulation of timed media data of an encoded video bit-stream in a way that enables spatial access to one or more tiles and that enables combination of accessed tiles.

It is to be recalled that encoded video bit-streams are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters.

A solution for describing tiles in ISO BMFF standard consists in encapsulating each tile into a particular track and in using the track's transformation matrix to signal tile positions. A natural approach using DASH standard would consist in describing each track in the manifest as independent media content. However, since current MPD definition does not allow tiled timed media data to be described, there is no way to signal that each track is a sub-part of the same video in the MPD.

Therefore, in practice, a client device would have to download a first initialization segment (in addition to the manifest) in order to be in position of determining that each video component described in the MPD is a sub-part of a tiled video (via track and matrix definitions, e.g. in boxes known as moov/track/tkhd). Next, the client device would have to download, at the minimum, the beginning of each first media data segment of each video component to retrieve the association between tile locations and video component (e.g. via the boxes known as moof/traf/tfhd). The downloading of this initialization information leads to delays and additional http roundtrips.

FIG. 1 illustrates schematically the use of tiles for streaming regions of interest of video sequences.

As illustrated, multiple resolution layers are computed from a high spatial resolution input video 100 comprising a set of images 105-1 to 105-*n* and each layer is divided into tiles, each tile being encoded independently. Similarly to a conventional video stream, a base layer tile shows the whole video scene. When a user wants to zoom into the video, tiles in the higher resolution layers are retrieved to provide higher quality details. Therefore, a client device needs to decode and synchronize multiple tiles for rendering a particular region of interest.

Alternatively, an overlapping tiling scheme can be used so that only one tile is needed to satisfy any region of interest. To handle different display sizes and network conditions, each tile is encoded at different spatial and quality resolutions.

An example of manifest file corresponding to input video 100 is given in the Appendix (Extract of code 1). According to this example, each image of high spatial resolution input video 100 comprises four segments arranged in a 2×2 matrix. The address of each segment and the position of the corresponding segment in the image are provided within the manifest.

US patent application US20100299630 discloses a system for visualizing regions of interest in panoramic images. However, only the case of pre-generated regions of interest (at the server end) and cropped images (at the client device end) are considered. It does not disclose any dynamic streaming of a user-selected region of interest.

<<In the article entitled "An interactive region-of-interest video streaming system for online lecture viewing", published in Packet Video Conference 2010, the authors mention the use of tiles for streaming regions of interest. A manifest is used to provide identifier and location items of information of the tiles (actually H.264 slices). However, even if the tiling configuration of each resolution layer is described in the manifest file, such a description does not provide a URL per tile. Furthermore, it requires some intelligence at the server end to interpret the specific http queries sent by the client to stream selected tiles. Indeed, from a base URL and tile items of information provided by the proprietary manifest (tile position and identifier), a client device can build a query of the HTTP GET query URL type, e.g. GET xxx?id=val, to access a particular tile, identified by the value of the identifier attribute read from the manifest. However, such a type of URL requires processing tasks at the server end to retrieve the file and byte-range in the file to be sent to the client device to fulfill its request. Moreover, it does not allow signaling tiles composition and/or exclusion items of information in the manifest.

According to patent application WO2012168365, a manifest file describes one or more spatial segment streams with their location information (URL) and a client device has the possibility to select one or more spatial areas. The manifest file also describes relationships between spatial segments, in particular to match a spatial area across resolution levels. However, a synchronization engine is required at the client end to provide the ability of streaming and displaying more than one tile at a time. Such a synchronization engine, when using DASH, requires timed segments in the manifest and reordering of the frames in the client device. The decoded spatial segment frames are stitched together for display as the selected region of interest.

To solve these issues, there is provided an efficient partition or tile description scheme for manifest, which ensures, whatever track combination is selected by a client application, that the result of the ISO BMFF parsing always leads to a valid video elementary bit-stream for the video decoder.

SUMMARY OF THE INVENTION

Faced with these constraints, the inventors provide a device for streaming partitioned timed media data.

It is a broad object of the invention to remedy the shortcomings of the prior art as described above.

According to a first aspect of the invention there is provided a method for receiving streamed timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the method comprising:

receiving a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data;

selecting at least one optional component that can be selected to reconstruct at least a portion of the partitioned timed media data;

requesting the at least one component that is required to reconstruct at least partially the partitioned timed media data and the at least one selected optional component that can be selected to reconstruct at least a portion of the partitioned timed media data; and on reception of the requested components, generating a playable media representation bit-stream from the received components.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the method further comprises parsing and analyzing the manifest for establishing a dependency relation between the at least one selected optional component that can be selected to reconstruct at least a portion of the partitioned timed media data and the at least one component that is required to reconstruct at least partially the partitioned timed media data.

In an embodiment, the dependency relation between the at least one selected optional component that can be selected to reconstruct at least a portion of the partitioned timed media data and the at least one component that is required to reconstruct at least partially the partitioned timed media data is established as a function of non-conventional values of conventional parameters of a conventional data structure of the manifest. The data structures and the data structure parameters of the manifest may comply, for example, with DASH standard.

In an embodiment, the step of requesting the at least one selected optional component that can be selected to reconstruct at least a portion of the partitioned timed media data comprises a step of requesting parameter values and a step of requesting, as a function of, in particular, the parameter values obtained in response to the step of requesting parameter values, the at least one selected optional component that can be selected to reconstruct at least a portion of the partitioned timed media data.

In an embodiment, the dependency relation between the at least one selected optional component that can be selected to reconstruct at least a portion of the partitioned timed media data and the at least one component that is required to reconstruct at least partially the partitioned timed media data is established as a function of values of non-conventional parameters of a conventional data structure of the manifest.

In an embodiment, the dependency relation between the at least one selected optional component that can be selected to reconstruct at least a portion of the partitioned timed media data and the at least one component that is required to reconstruct at least partially the partitioned timed media data is established as a function of values of parameters of a non-conventional data structure of the manifest.

It is to be noted that when frames of a base layer are divided into tiles, such non-conventional parameters of a conventional or non-conventional data structure of the manifest can be used to describe dependencies between tiles of different layers such as tiles of a base layer and tiles of an enhancement layer.

In an embodiment, the method further comprises building an index table, the built index table associating a request address with an identifier of each optional component referred to in the at least one representation.

In an embodiment, the method further comprises associating a position with each optional component identifier in the index table, the position representing a position at which media data associated with the corresponding optional component are to be positioned in a reconstructed portion of the partitioned timed media data.

In an embodiment, the method further comprises parsing the at least one component that is required to reconstruct at least partially the partitioned timed media data, the playable media representation bit-stream being generated as a function of media data of the at least one selected optional component determined as a function of the parsed data of the at least one component that is required to reconstruct at least partially the partitioned timed media data.

A second aspect of the invention provides a method for receiving streamed timed media data organized into temporal media segments, the timed media data belonging to tiled timed media data comprising timed samples, each timed sample comprising a plurality of subsamples, the timed media data being transmitted as at least one media segment file comprising independently encapsulated tracks comprising at least one tile track containing a subsample selected from among the plurality of subsamples of one of the timed samples and one corresponding subsample of each of the other timed samples and at least one composite track comprising at least one extractor identifying at least one tile track, the method comprising:

receiving a manifest describing a plurality of versions of the tiled timed media data, the manifest comprising representations, each representation comprising at least a description of a version of a portion of the tiled timed media data, at least one said representation comprising a description of a plurality of tracks among which are at least one composite track and at least one tile track;

selecting at least one tile track;

requesting the at least one composite track and the at least one selected tile track; and on reception of the requested tracks, generating a playable media representation bit-stream from the received tracks.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the method further comprises parsing and analyzing the manifest for establishing a dependency relation between the at least one selected tile track and the at least one composite track.

In an embodiment, the dependency relation between the at least one selected tile track and the at least one composite track is established as a function of non-conventional values of conventional parameters of a conventional data structure of the manifest. The data structures and the data structure parameters of the manifest may comply, for example, with DASH standard.

In an embodiment, the step of requesting the at least one selected tile track comprises a step of requesting parameter values and a step of requesting, as a function of, in particular, the parameter values obtained in response to the step of requesting parameter values, the at least one selected tile track.

In an embodiment, the dependency relation between the at least one selected tile track and the at least one composite track is established as a function of values of non-conventional parameters of a conventional data structure of the manifest.

In an embodiment, the dependency relation between the at least one selected tile track and the at least one composite track is established as a function of values of parameters of a non-conventional data structure of the manifest.

It is to be noted that when frames of a base layer are divided into tiles, such non-conventional parameters of a conventional or non-conventional data structure of the manifest can be used to describe dependencies between tiles of different layers such as tiles of a base layer and tiles of an enhancement layer.

In an embodiment, the method further comprises comprising building an index table, the built index table associating a request address with an identifier of each tile track referred to in the at least one representation.

In an embodiment, the method further comprises associating a position with each tile track identifier in the index table, the position representing a position at which media data associated with the corresponding tile track are to be positioned in a reconstructed portion of the tiled timed media data.

In an embodiment, the method further comprises parsing the at least one composite track, the playable media representation bit-stream being generated as a function of media data of the at least one selected tile track determined as a function of the parsed data of the at least one composite track.

A third aspect of the invention provides a method for transmitting timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the method comprising:

- transmitting a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the method further comprises:

- receiving a request for transmitting the at least one component that is required to reconstruct at least partially the partitioned timed media data;
- receiving at least one request for transmitting at least one selected optional component that can be selected to reconstruct at least a portion of the partitioned timed media data; and
- transmitting the at least one component that is required to reconstruct at least partially the partitioned timed media data and the at least one selected component.

In an embodiment, the method further comprises receiving a request for parameter values and transmitting the requested parameter values prior to receive at least one request for transmitting at least one selected optional component that can be selected to reconstruct at least a portion of the partitioned timed media data, the at least one request for transmitting at least one selected optional component that can be selected to reconstruct at least a portion of the partitioned timed media data being based, in particular, on the transmitted parameter values.

A fourth aspect of the invention provides a method for generating a media presentation description allowing the transmission of an item of partitioned timed media data comprising timed samples, each timed sample comprising a plurality of subsamples, the partitioned timed media data, organized into temporal media segments, being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the method comprising:

- obtaining dependency relations between components of a plurality of components of the partitioned timed media data, at least one component of the plurality of component being required to reconstruct at least partially the partitioned timed media data and at least one component of the plurality of component being optional to reconstruct at least a portion of the partitioned timed media data;
- generating a manifest describing a plurality of versions of the partitioned timed media data, the manifest comprising representations, each representation comprising at least a description of a version of a portion of the partitioned timed media data, at least one said representation comprising a description of the least one component that is required to reconstruct at least partially the partitioned timed media data and of the at least one component that is optional to reconstruct at least a portion of the partitioned timed media data.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the dependency relations are characterized by using predetermined non-conventional values of conventional parameters of a conventional data structure of the manifest. The data structures and the data structure parameters of the manifest may comply, for example, with DASH standard.

In an embodiment, the dependency relations are characterized by using predetermined values of non-conventional parameters of a conventional data structure of the manifest.

In an embodiment, the dependency relations are characterized by using predetermined values of parameters of a non-conventional data structure of the manifest.

It is to be noted that when frames of a base layer are divided into tiles, such non-conventional parameters of a conventional or non-conventional data structure of the manifest can be used to describe dependencies between tiles of different layers such as tiles of a base layer and tiles of an enhancement layer.

A fifth aspect of the invention provides a device comprising means adapted for carrying out each step of the method described above.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

A sixth aspect of the invention provides a device for receiving streamed timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the device comprising at least one microprocessor configured for carrying out the steps of:

receiving a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data;

selecting at least one optional component that can be selected to reconstruct at least a portion of the partitioned timed media data;

requesting the at least one component that is required to reconstruct at least partially the partitioned timed media data and the at least one selected optional component that can be selected to reconstruct at least a portion of the partitioned timed media data; and on reception of the requested components, generating a playable media representation bit-stream from the received components.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the microprocessor is further configured for carrying out the step of parsing and analyzing the manifest for establishing a dependency relation between the at least one selected optional component that can be selected to reconstruct at least a portion of the partitioned timed media data and the at least one component that is required to reconstruct at least partially the partitioned timed media data.

In an embodiment, the microprocessor is further configured so that the step of requesting the at least one selected optional component that can be selected to reconstruct at least a portion of the partitioned timed media data comprises a step of requesting parameter values and a step of requesting, as a function of, in particular, the parameter values obtained in response to the step of requesting parameter values, the at least one selected optional component that can be selected to reconstruct at least a portion of the partitioned timed media data.

In an embodiment, the microprocessor is further configured for carrying out the step of building an index table, the built index table associating a request address with an identifier of each optional component referred to in the at least one representation.

In an embodiment, the microprocessor is further configured for carrying out the step of associating a position with each optional component identifier in the index table, the position representing a position at which media data associated with the corresponding optional component are to be positioned in a reconstructed portion of the partitioned timed media data.

In an embodiment, the microprocessor is further configured for carrying out the step of parsing the at least one component that is required to reconstruct at least partially the partitioned timed media data, the playable media representation bit-stream being generated as a function of media data of the at least one selected optional component determined as a function of the parsed data of the at least one component that is required to reconstruct at least partially the partitioned timed media data.

A seventh aspect of the invention provides a device for receiving streamed timed media data organized into temporal media segments, the timed media data belonging to tiled timed media data comprising timed samples, each timed sample comprising a plurality of subsamples, the timed media data being transmitted as at least one media segment file comprising independently encapsulated tracks comprising at least one tile track containing a subsample selected from among the plurality of subsamples of one of the timed samples and one corresponding subsample of each of the other timed samples and at least one composite track comprising at least one extractor identifying at least one tile track, the device comprising at least one microprocessor configured for carrying out the steps of:

receiving a manifest describing a plurality of versions of the tiled timed media data, the manifest comprising representations, each representation comprising at least a description of a version of a portion of the tiled timed media data, at least one said representation comprising a description of a plurality of tracks among which are at least one composite track and at least one tile track;

selecting at least one tile track;

requesting the at least one composite track and the at least one selected tile track; and on reception of the requested tracks, generating a playable media representation bit-stream from the received tracks.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the microprocessor is further configured for carrying out the step of parsing and analyzing the manifest for establishing a dependency relation between the at least one selected tile track and the at least one composite track.

In an embodiment, the microprocessor is further so that the step of requesting the at least one selected tile track comprises a step of requesting parameter values and a step of requesting, as a function of, in particular, the parameter values obtained in response to the step of requesting parameter values, the at least one selected tile track.

In an embodiment, the microprocessor is further configured for carrying out the step of building an index table, the built index table associating a request address with an identifier of each tile track referred to in the at least one representation.

In an embodiment, the microprocessor is further configured for carrying out the step of associating a position with each tile track identifier in the index table, the position representing a position at which media data associated with the corresponding tile track are to be positioned in a reconstructed portion of the tiled timed media data.

In an embodiment, the microprocessor is further configured for carrying out the step of parsing the at least one composite track, the playable media representation bit-stream being generated as a function of media data of the at least one selected tile track determined as a function of the parsed data of the at least one composite track.

An eighth aspect of the invention provides a video decoder comprising the device described above.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

A ninth aspect of the invention provides a device for transmitting timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the device comprising at least one microprocessor configured for carrying out the steps of:

transmitting a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

In an embodiment, the microprocessor is further configured for carrying out the step of:

receiving a request for transmitting the at least one component that is required to reconstruct at least partially the partitioned timed media data;

receiving at least one request for transmitting at least one selected optional component that can be selected to reconstruct at least a portion of the partitioned timed media data; and transmitting the at least one component that is required to reconstruct at least partially the partitioned timed media data and the at least one selected component.

In an embodiment, the microprocessor is further configured for carrying out the step of receiving a request for parameter values and transmitting the requested parameter values prior to receive at least one request for transmitting at least one selected optional component that can be selected to reconstruct at least a portion of the partitioned timed media data, the at least one request for transmitting at least one selected optional component that can be selected to reconstruct at least a portion of the partitioned timed media data being based, in particular, on the transmitted parameter values.

A tenth aspect of the invention provides a device for generating a media presentation description allowing the transmission of an item of partitioned timed media data comprising timed samples, each timed sample comprising a plurality of subsamples, the partitioned timed media data, organized into temporal media segments, being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the device comprising at least one microprocessor configured for carrying out the steps of:

obtaining dependency relations between components of a plurality of components of the partitioned timed media data, at least one component of the plurality of component being required to reconstruct at least partially the partitioned timed media data and at least one component of the plurality of component being optional to reconstruct at least a portion of the partitioned timed media data;

generating a manifest describing a plurality of versions of the partitioned timed media data, the manifest comprising representations, each representation comprising at least a description of a version of a portion of the partitioned timed media data, at least one said representation comprising a description of the least one component that is required to reconstruct at least partially the partitioned timed media data and of the at least one component that is optional to reconstruct at least a portion of the partitioned timed media data.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

An eleventh aspect of the invention provides a video encoder comprising the device described above.

Accordingly, the invention makes it possible for a client device to identify from a manifest file required data and optional data and to dynamically select a set of optional data to stream. Applied to tiles, this makes it possible to dynamically adapt the streaming to user-defined regions of interest. With the invention, a client device can be informed that videos from a media presentation offer spatial access. By using information from the manifest, a client device can decide to dynamically switch to a specific spatial area of a video and also dynamically switch back to the full-frame video.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 5, comprising

FIG. 11, comprising

DETAILED DESCRIPTION OF EMBODIMENTS OF THE INVENTION

According to a particular embodiment, there is described a solution based on a compact description of spatial subparts of a video sequence in a manifest, that can be easily integrated, in particular, in file conforming to the DASH MPD standard. By using such a solution, a client device may obtain knowledge about the existence of spatial media components and obtain HyperText Transfer Protocol (http) addresses for downloading each of these media components. To that end, manifest files comprise information regarding optional dependencies between video representations.

According to a particular embodiment, video sequences are encoded into independent spatial partitions (e.g. tiles), each encoded partition being encapsulated in the file format as an independent track (partition track or tile track). An additional track, referred to as a reference track or a composite track, comprising references to data of partition tracks, is used to encapsulate any composition of more than one partition track. Such an encapsulation of the partition tracks and the reference track is signaled in a manifest to inform a client device on the availability of spatial access. The manifest also includes a description of each partition track as an optional addressable component of the composite track.

Various embodiments, resulting from a trade-off between importance of syntax modifications and completeness of the description, can be provided.

According to a particular embodiment, partitioned timed media data such as tiled timed media data (e.g. video data) comprising timed samples (e.g. images) are transmitted as a set of several timed media data tracks, typically a base layer track and several tile tracks, and a reference or composite track that comprises references to timed media data tracks. Each tile track comprises one spatial subsample (e.g. several Network Abstraction Layer (NAL) units) of several timed samples. An extended extractor type is defined for referencing timed media data tracks from a composite track. Timed media data tracks are labeled as not displayable and convey and describe timed media data for tiles. Such a set of timed media data tracks and a composite track allows the selecting, composing, and efficient streaming of spatial video tiles. Each track can be transmitted from a server to a client device as a set of media segment files. An initialization segment file can be used to transmit metadata required to decode media segment files.

Figure 2:
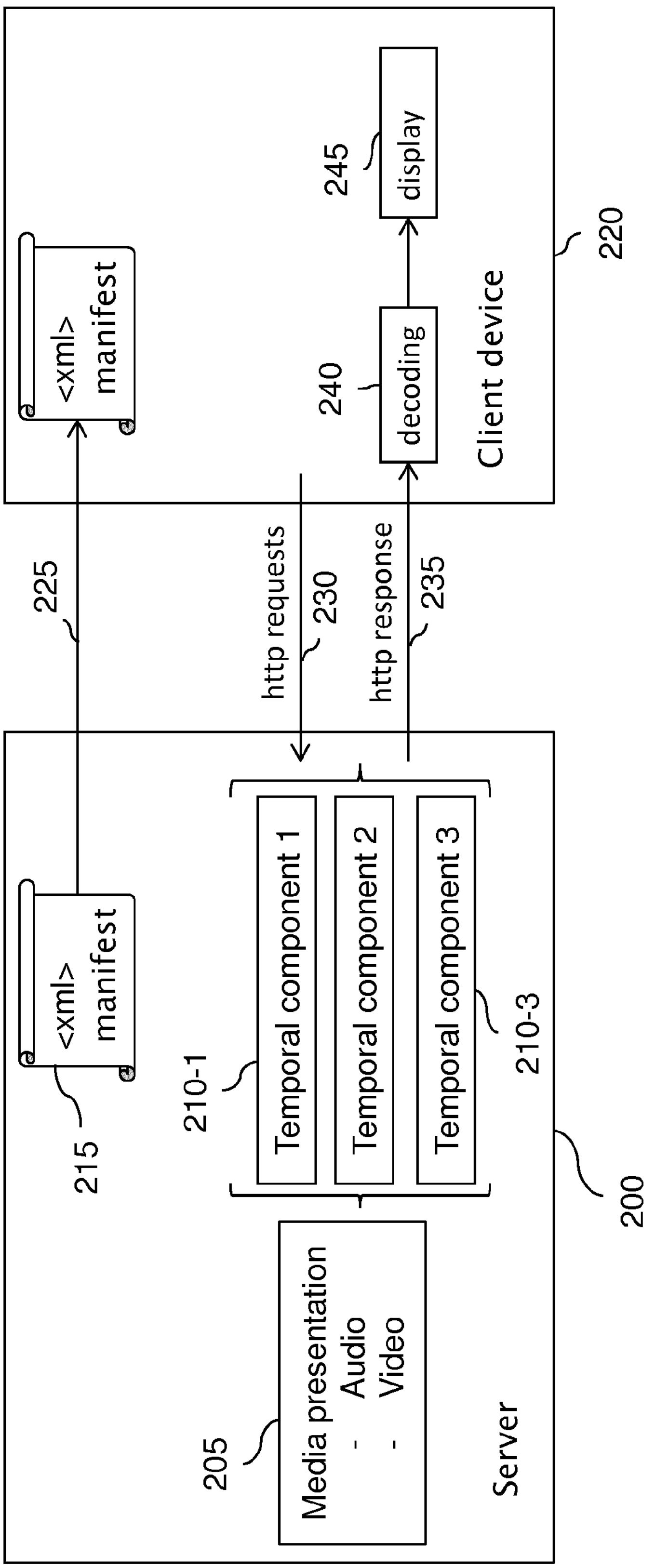
FIG. 2 illustrates a general principle of adaptive media presentation streaming over a communication network according to HyperText Transfer Protocol.

FIG. 2 illustrates a general principle of adaptive media presentation streaming over a communication network according to http. Most of the protocols and standards for media streaming over http are based on this principle.

Figure 3:
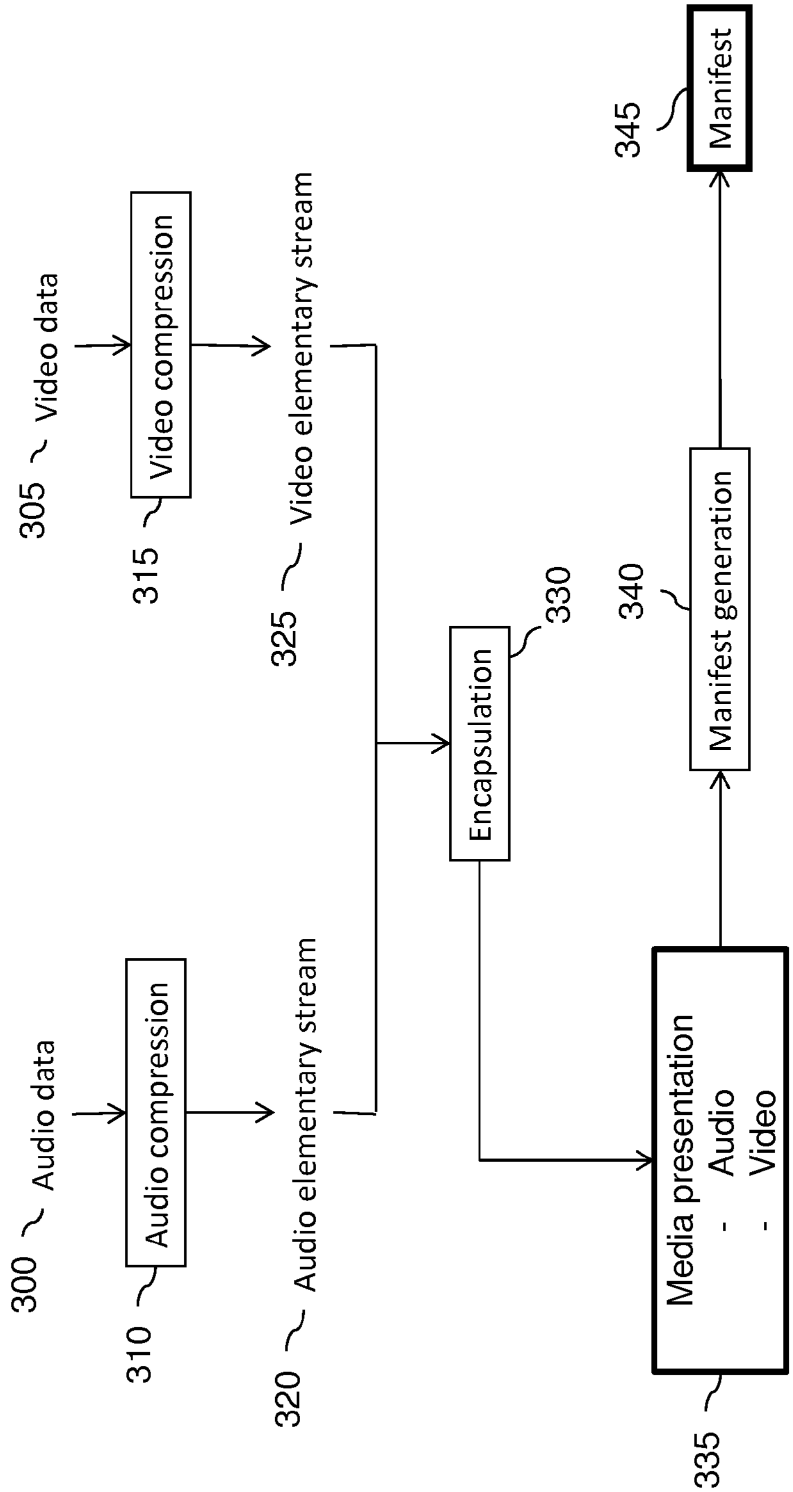
FIG. 3 illustrates steps for generating a media presentation and a corresponding manifest file.

As illustrated, server 200 comprises media presentations among which, in particular, is media presentation 205 that contains interleaved video and audio components. FIG. 3 illustrates schematically how such a media presentation can be constructed.

During encoding, media presentations are temporally split into small independent and consecutive temporal components, for example components conforming to the MP4 standard (ISO/IEC 14496-14), that can be addressed and downloaded independently. Addresses (i.e., http addresses in the described embodiment) are set by server 200 for all the segments of each obtained temporal components and a manifest is created as described by reference to FIG. 4.

As described above, a manifest is a document, typically an XML file, that describes the content of all temporal components that can be accessed for a given media presentation. Such a description may comprise the types of the media components (for example audio, video, audio-video, or text), the time durations of the media segments, and the addresses (e.g. the URL) associated with the media segments, that is to say the addresses from which the media components can be obtained.

Typically, a MPD is based on a hierarchical data model. It consists of one or multiple periods, each period having a starting time and a duration and consists of one or multiple adaptation sets. An adaptation set provides the information about one or multiple media components and its various encoded alternatives, each encoded alternative of the same media component being referred to as a representation. In turn, each representation typically consists of one or multiple segments.

For the sake of illustration, the interleaved audio and video data of media presentation 205 is temporally split into consecutive temporal components, for example into three consecutive temporal components 210-1 to 210-3 corresponding to three consecutive periods. Each of these media components comprises at least one adaptation set (not represented) that comprises at least one representation (not represented) that contains several media segments (not represented). The addresses of these segments are set by server 200. These addresses and other items of information relative to the temporal components 210-1 to 210-3 are accessible in manifest 215 corresponding to media presentation 205.

This manifest file is sent to client device 220 (step 225). After having been received, manifest file 215 is analyzed by client device 220 to determine accessible media segments of media components 210-1 to 210-3 of media presentation 205, the http addresses of these media segments, and the relations between these media segments. Moreover, manifest file 215 gives items of information about the content of the media presentation (i.e. interleaved audio and video in the given example). These items of information may comprise a resolution, a bit-rate, and similar information.

In view of this information, client device 220 can therefore select media segments to receive and emit corresponding http requests (step 230) for downloading these segments. In response, server 200 transmits the requested temporal segments (step 235). These temporal segments can be decoded in decoder 240 and displayed on display 245.

FIG. 3 illustrates steps for generating a media presentation and a corresponding manifest file. Such steps are typically carried out by a server such as server 200 in FIG. 2.

As illustrated, audio and video data are obtained during steps 300 and 305, respectively. Such data can be obtained, for example, from an external source, via a communication network, such as a data storage server connected to the server carrying out the steps illustrated in FIG. 3.

Audio data are compressed during step 310. Such a compression can be based, for example, on the MP3 standard (MPEG-1/2 Audio Layer 3). In parallel, video data are also compressed during step 315. To that end, video data compression algorithm like MPEG4, MPEG/AVC, SVC, HEVC, or scalable HEVC can be used.

The audio and video data are compressed as data elementary streams, as illustrated with references 320 and 325, respectively. These elementary streams are encapsulated during step 330 to create a global media presentation 335.

For example, the ISO BMFF standard (or, still for the sake of illustration, the extension of this ISO BMFF standard to AVC, SVC, or HEVC) can be used for describing the content of the encoded audio and video elementary streams as a global media presentation. Accordingly, the encapsulated media presentation is used as input for the generation (step 340) of a manifest, for example XML manifest 345.

As described above for the specific case of DASH, the manifest file (MPD) is hierarchically organized by components (associated with periods), adaptation sets, representations, and segments. In other words, a media presentation is split into temporal periods, the MPD containing all the data related to each period. By receiving corresponding items of information, a client device can determine the media presentation content for each period of time.

Again, this content is organized into adaptation sets, a possible organization being to have one or more adaptation sets per media type contained in the media presentation. An adaptation set relating to video data typically contains items of information about the different possible representations of the corresponding encoded video data component available from the server. For the sake of illustration, a first representation can be directed to video data encoded at a spatial resolution of 640×480 pixels and compressed at a bit-rate of 500 kbits/s. A second representation can be directed to a similar video content but compressed at a bit-rate of 250 kbits/s. Each representation can then be downloaded by a client device as segments using http requests under the condition that the client device knows the corresponding http addresses.

The association between video data of each representation and http addresses is made by using a specific level of description referred to as temporal segments. Accordingly, each video representation is split into temporal segments (having a duration of typically a few seconds). Therefore, each temporal segment is a portion of a video content stored in the server that is accessible through a particular http address (URL or URL with one byte range).

In addition, a specific segment known as the initialization segment is created and made accessible to a client device. This initialization segment may contain MP4 initialization items of information (if the video has been encapsulated by using the ISO BMFF or extensions) that describe the encapsulated video stream. For the sake of illustration, these items of information help a client device to instantiate the decoding algorithms relating to the accessed compressed video data. The http addresses of the initialization segment and of the media segments are given in the MPD file. An example of an MPD file is given in the Appendix (Extract of code 2).

Extract of code 2 given in the Appendix illustrates an example of a DASH manifest (MPD) for a given media presentation. The aim of this example is to present the main characteristics of an MPD. It is to be noted that for the sake of clarity, the representations given in this example are not split into temporal segments.

In this MPD example, two types of media data are described for one period. The first one is an English audio stream and the second one is a video stream.

The English audio stream is introduced through the 'AdaptationSet' tag of the 'audio/MP4' type. The MPD describes two representations of this audio stream:

- the first representation (having index one: <Representation id="1" . . . >) is an MP4 encapsulated elementary audio stream having a bit-rate equal to 64,000 (bandwidth="64000") bytes per second. As indicated in this example, the codec to use for handling this elementary stream (after mp4 parsing) is defined in the standard by the attribute 'mp4a.0x40' (<AdaptationSet . . . codecs="mp4a.0x40" . . . >). According to this example, the representation is accessible on request at the address: <BaseURL>7657412348.mp4</BaseURL>, the <BaseURL> being defined in the MPD by 'http://cdn1.example.com/' or by 'http://cdn2.example.com' (two servers are available for streaming the same content). Accordingly, a client device can request the English audio stream using a corresponding request to the address 'http://cdn1.example.com/7657412348.mp4' or to the address 'http://cdn2.example.com/7657412348.mp4'; and
- the second representation (having index two: <Representation id="2" . . . >) is an MP4 encapsulated elementary audio stream having a bit-rate equal to 32,000 bytes per second.

The video stream is introduced through the 'AdaptationSet' tag of the 'video/MP4' type. The MPD describes six representations of this video stream. As indicated in the MPD, these representations contain videos at different spatial resolutions (320×240, 640×480, and 1280×720 pixels) and at different bit-rates (from 256000 to 2048000 bytes per second). For each of these representations, a different URL is associated. The client device can therefore choose one representation among these alternative representations of the same video data as a function of criteria such as an estimated bandwidth and a screen resolution.

From this example, one can understand the limitations of conventional MPD regarding the description of tile tracks for the streaming of regions of interest. Although tile tracks can be described as representation of full video frames, tile tracks may not be displayable, depending on the encapsulation, in particular if they contain only tile data. Initialization data for the decoder may be missing. Accordingly, by using conventional MPD and one representation per tile track, client devices cannot obtain items of information regarding the possibilities of tile combination or even incompatibilities. In other words, each tile would be seen as an alternative to another tile thus preventing multiple tile selection. The only combination that could be signaled is a combination of all tiles, using for example the attribute known as dependencyId in the Representation element of a composite track or no tile at all provided that the full-frame video has its own Representation in the manifest. Several embodiments are described herein below to solve this issue.

As described above, tiles are independently decodable spatial areas of video frames.

Figure 1:
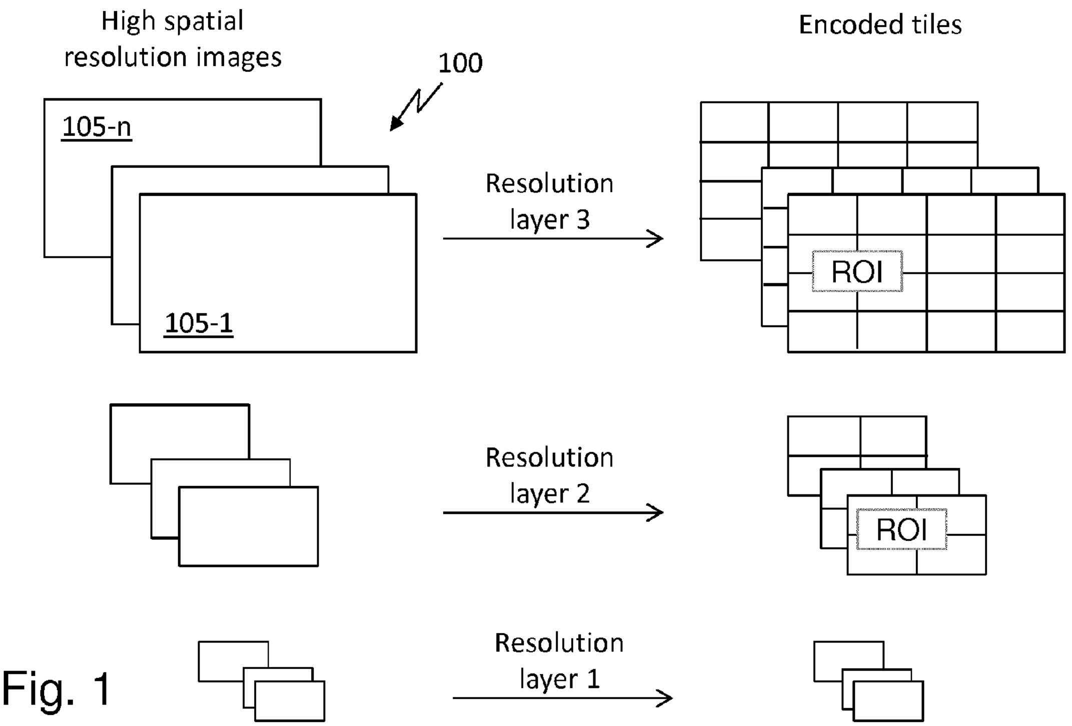
FIG. 1 illustrates schematically the use of tiles for streaming regions of interest of video sequences.
Figure 4:
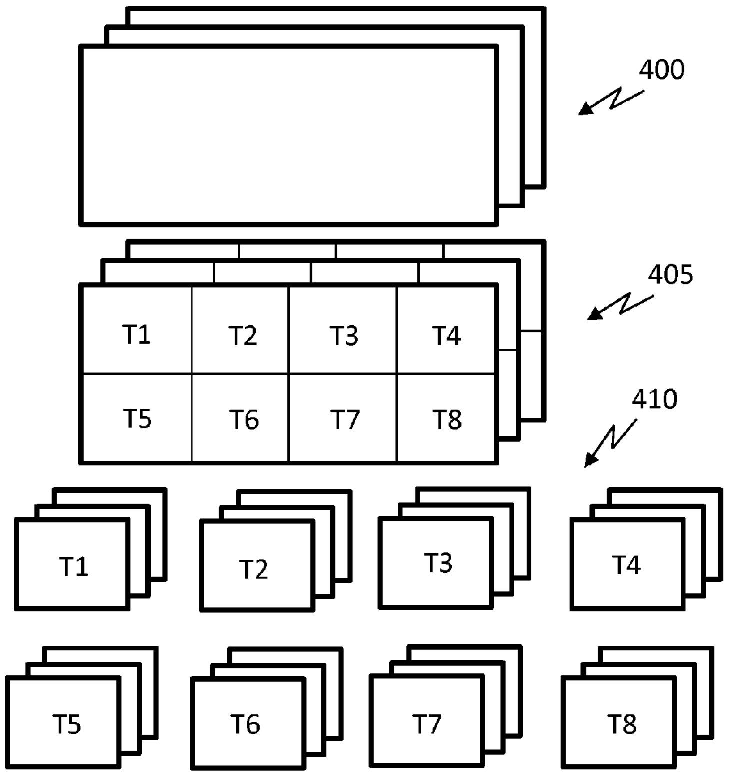
FIG. 4 illustrates video tiling and how it applies to compressed video data.

FIG. 4 illustrates video tiling and how it applies to compressed video data. As illustrated, video stream 400 comprises a set of consecutive temporal frames (for the sake of illustration, three consecutive temporal frames are represented). Each frame can be divided into rectangles, for example eight rectangles as illustrated with reference 405, referred to as tiles Tn (with n varying from 1 to 8). Naturally the number and the shape of the tiles can be different. However, for the sake of illustration, it is considered that tiling is the same whatever the index of the considered video frame.

As a result of the tiling, independent sub-videos (eight in the illustrated example) are obtained. These sub-videos, referred to as 410, are partitions of the whole video. Each independent sub-video can be encoded as an independent bit-stream conforming, for example, to AVC or HEVC standard, or it can be a part of a single video bit-stream such as a tile in a HEVC bit-stream or a slice in AVC.

This tiling organization of the video can be extended to other configurations, especially when considering scalable video encoding formats such as SVC or scalable HEVC.

Figure 11A:
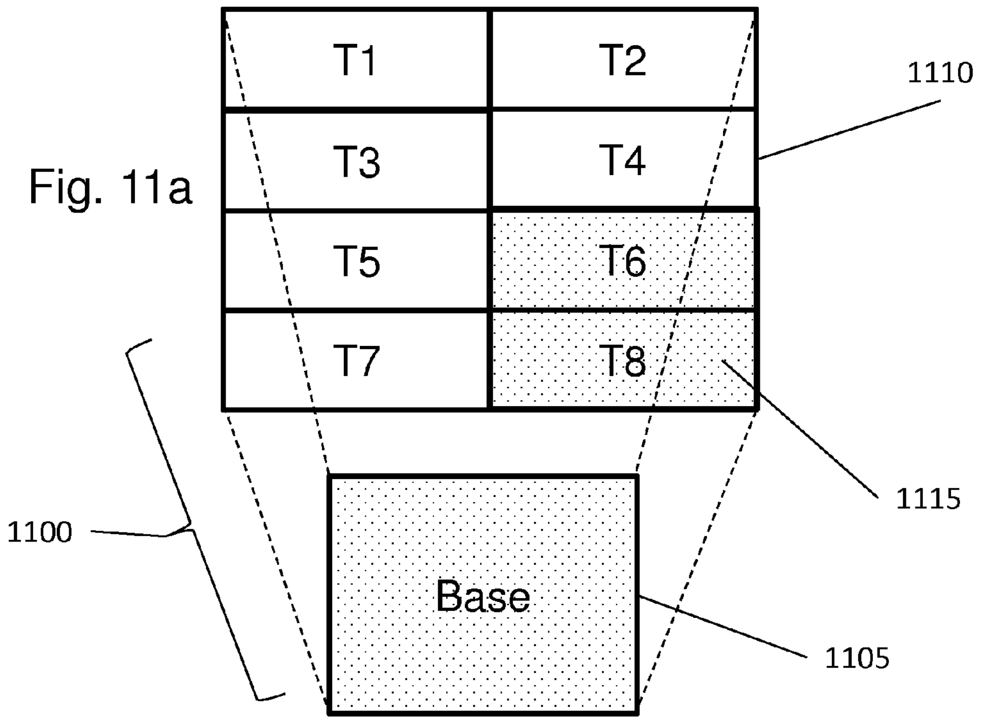
FIGS. 11*a* and 11*b*, illustrates examples of tiling configuration for spatially scalable videos.
Figure 11B:
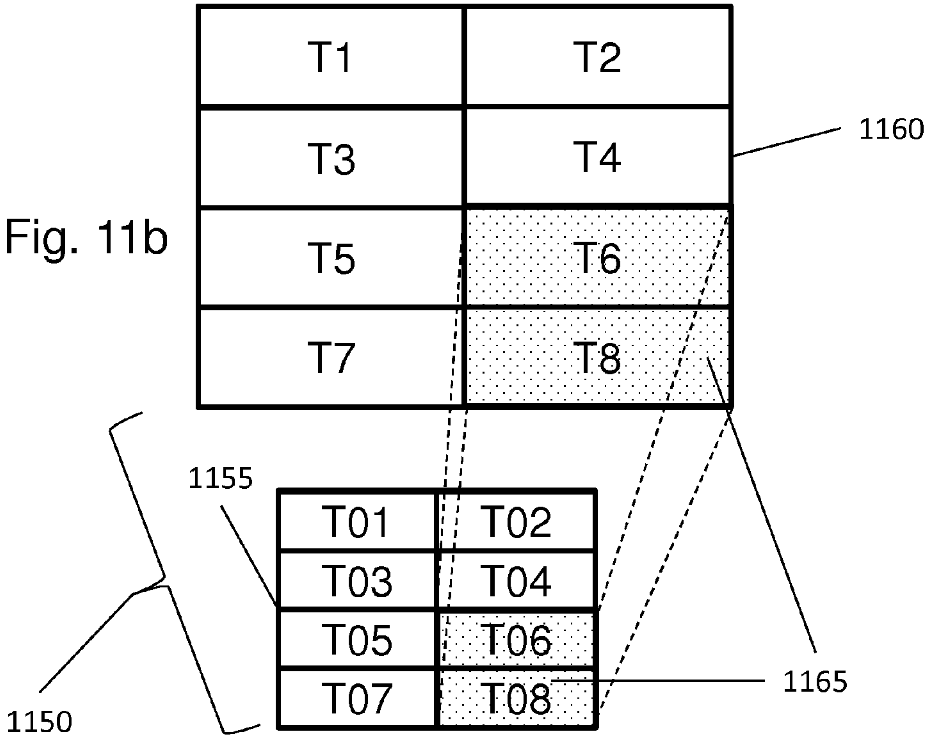

FIG. 11, comprising FIGS. 11*a* and 11*b*, illustrates examples of tiling configurations.

FIG. 11*a* illustrates a particular tiling configuration. As illustrated, frame 1100 of a video sequence (not represented) is encoded as a scalable video with a base layer frame 1105 and a spatial enhancement layer frame 1110 that is divided into eight tile portions (T1, T2, . . . , T8). The base layer is not tiled. Accordingly, each tile of the enhancement layer (e.g., each tile portion of the enhancement layer frame 1110) depends on the whole base layer. In such a frame organization, when a portion of an image such as portion 1115 is selected to stream a spatial part of the frames (e.g. the right bottom part of the frame 1100), the selected tiles (e.g. tiles T6 and T8) and the base layer are needed. As illustrated in FIG. 11*a*, selected portion 1115, representing a region of interest, is encompassed by the two tiles T6 and T8 and the base layer 1105.

FIG. 11*b* illustrates another particular tiling configuration. As illustrated, a video sequence comprising frame 1150 is encoded as a tiled base layer (i.e. tile base layer frame 1155) and a tiled spatial enhancement layer (i.e. tiled spatial enhancement layer frame 1160) with spatial dependencies that are tiled-based: one tile of the enhancement layer depends only on the tile at the same position in the base layer. In such a configuration, when a user selects a region of interest such as ROI 1165, he/she needs the two tiles T6 and T8 of the enhancement layer frame 1160 and the two reference tiles T06 and T08 of the base layer frame 1155.

Figure 12:
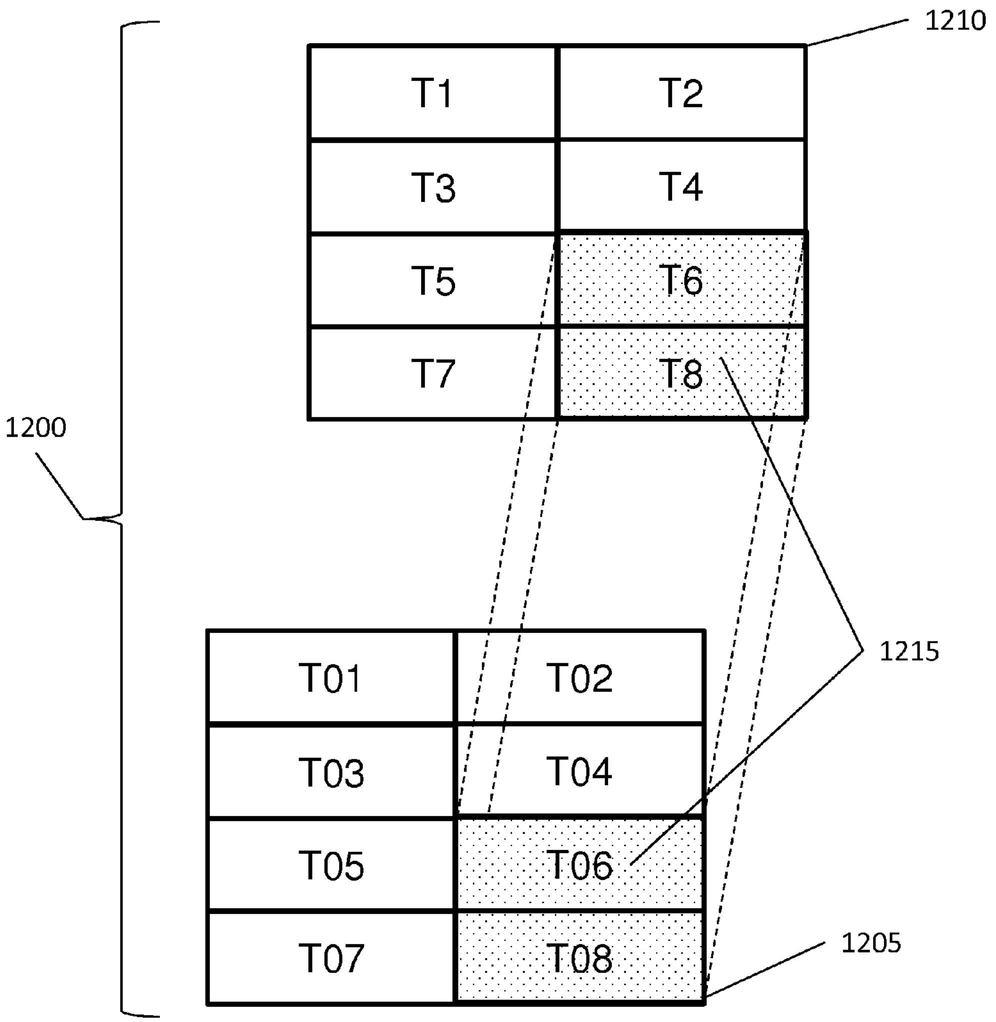
FIG. 12 illustrates an example of tiling configuration for SNR (Signal-to-noise ratio) scalable videos.

FIG. 12 illustrates an example of tiling configuration for scalability of the SNR (Signal-to-noise ratio) type. In such a configuration, tiles of an enhancement layer, for example tile portions T1 to T2 of enhancement layer frame 1210 of frame 1200, depend on the same tiles of the base layer, for example on tile portions T01 to T08 of the base layer frame 1205. Dependencies are tile-based. In such a case, when a user selects an image portion for streaming, for example area 1215 of frame 1200, tiles of the enhancement layer are streamed with the corresponding dependent tiles of the base layer, for example tile portions T6 and T8 from enhancement layer frame 1210 are streamed with tile portions TO6 and T08 of base layer frame 1205.

A user-selected region of interest may correspond to one or several adjacent tiles (e.g., the combination of tiles T6 and T8 in the examples illustrated in FIGS. 11 and 12 or T6 and T2 in the examples illustrated in FIG. 4).

As described above, an embodiment of the invention can apply, in particular, to the HEVC video format.

According to HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTU). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in terms of tiles but are based on slices.

In HEVC standard, slices are sets of slice segments, the first slice segment of a set of slice segments being an independent slice segment, that is to say a slice segment for which general information stored within a header does not refer to that of another slice segment. The other slice segments of the set of slice segments, if any, are dependent slice segments (i.e. slice segments for which general information stored within a header refers to that of an independent slice segment).

A slice segment contains an integer number of consecutive (in raster scan order) Coding Tree Units. Therefore, a slice segment can be of a rectangular shape or not and it is thus not suited to represent a region of interest. It is encoded in an HEVC bit-stream I, the form of a slice segment header followed by slice segment data. Independent and dependent slice segments differ by their header: since a dependent slice segment depends on an independent slice segment, the amount of information of its header is smaller than in the header of an independent slice segment. Both independent and dependent slice segments contain a list of entry points into the corresponding bit-stream that are used to define tiles or as entropy decoding synchronization points.

Figure 5A:
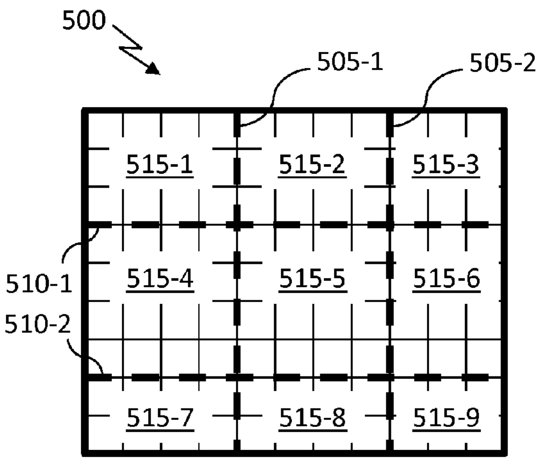
FIGS. 5*a*, 5*b*, and 5*c*, illustrates examples of tiles and slice segments.
Figure 5B:
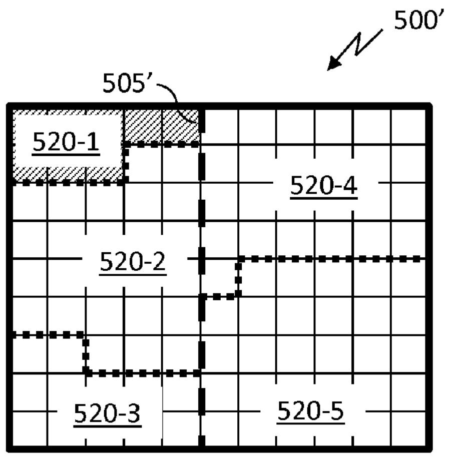
Figure 5C:
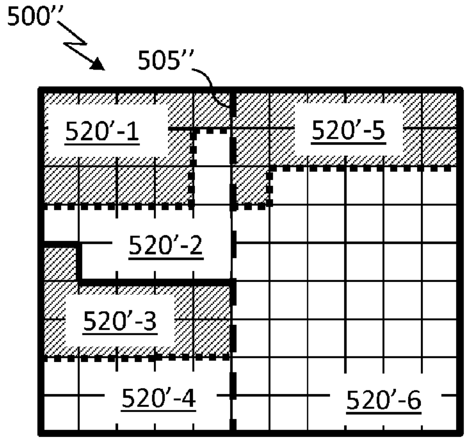

FIG. 5, comprising FIGS. 5*a*, 5*b*, and 5*c*, illustrates examples of tiles and slice segments. More precisely, FIG. 5*a* illustrates an image (500) divided into nine portions by vertical boundaries 505-1 and 505-2 and horizontal boundaries 510-1 and 510-2. Each of the nine portions referenced 515-1 to 515-9 represents a particular tile.

FIG. 5*b* illustrates an image (500') containing two vertical tiles delimited by vertical boundary 505'. Image 500' comprises a single slice (not referenced) containing five slice segments, one independent slice segment 520-1 (represented with hatched lines) and four dependent slice segments 520-2 to 520-5.

FIG. 5*c* illustrates an image (500") containing two vertical tiles delimited by vertical boundary 505". The left tile comprises two slices: a first slice containing one independent slice segment (520'-1) and one dependent slice segment (520'-2) and a second slice also containing one independent slice segment (520'-3) and one dependent slice segment (520'-4). The right tile comprises one slice containing one independent slice segment (520'-5) and one dependent slice segment (520'-6).

According to HEVC standard, slice segments are linked to tiles according to rules that may be summarized as follows (one or both conditions have to be met):

- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

For the sake of clarity, it is considered in the following that one tile contains one slice having only one independent slice segment. However, embodiments of the invention can be carried out with other configurations like the ones illustrated in FIGS. 9*b* and 9*c*.

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <=
    RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile from using temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in HEVC standard. It is set in slice segment header with a flag known as loop filter across tiles enabled flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles". This information on tile coding dependencies can be set in a dedicated SEI (Supplemental Enhancement Information) message of the HEVC bit-stream to signal ROI information.

When a video bit-stream is encoded as a set of independent tiles, it then enables tile-based decoding from one frame to another without any risk of missing reference data or propagation of reconstruction errors. This configuration then makes it possible to reconstruct only a spatial part of the original video that can correspond, for example, to a region of interest illustrated in FIG. 4 (comprising tiles T2 and T6) or in FIGS. 11 and 12 (comprising tiles T6 and T8). Such a configuration, independent tiles, and tile-based dependencies, can be indicated in SEI messages in the video bit-stream. This can be exploited in encapsulation and description level so as to indicate that tile-based decoding is reliable.

Before being described in a manifest, each tile must be processed for being encapsulated in a standard format. Such an encapsulation stage is described by reference to FIG. 6. For the sake of illustration, the encapsulation format complies with ISO BMFF standard (or is an extension of a media file conforming to this standard). This is one of the formats for which the MPEG/DASH standard specifies construction guidelines.

Independent tiles are provided as an input of an encapsulation module and each tile is considered as an independent track for encapsulation. For each encoded tile, a tile track is defined in the resulting ISO BMFF file. Each tile track then represents a spatial part of the whole (or full-frame) video. Additional tracks such as an audio track or a text track can be used and encapsulated in the same file.

A composite track is created and defined in the ISO BMFF file. It is used to handle any combination of tiles.

According to the organization of tile tracks and of the composite track, tile data are split into independent and addressable tracks so that any combination of tile tracks can easily be constructed from a composite track that references the tile tracks.

For each tile track, tile items of information such as tile position, tile size, and bandwidth are stored in track header, for example in track header boxes known as 'moov' box. For streaming, these items of information can be stored in an initialization segment defined in DASH standard.

In addition to the initialization segment, the encapsulation process generates segment files (media segments that may be accessed through an URL when the MPD is generated) that correspond to small periods of time. The segments typically correspond to movie fragments (e.g. boxes known as 'moof' and 'mdat'). One mp4 segment file is generated per movie fragment and per tile track so that each spatio-temporal portion of the video becomes addressable.

The composite track follows the same temporal decomposition and can also be addressed temporally. It is mainly composed of extractors, typically mp4 extractors, each extractor referencing one tile track. It also contains specific extractors that, at parsing time, support the absence of data. Of course, the number of movie fragments and the corresponding mp4 segments as well as their granularity are not limited. The choice is done as a function of the application.

The encapsulation process is used by a manifest generator to describe in the manifest the video contained in the media presentation.

Figure 6:
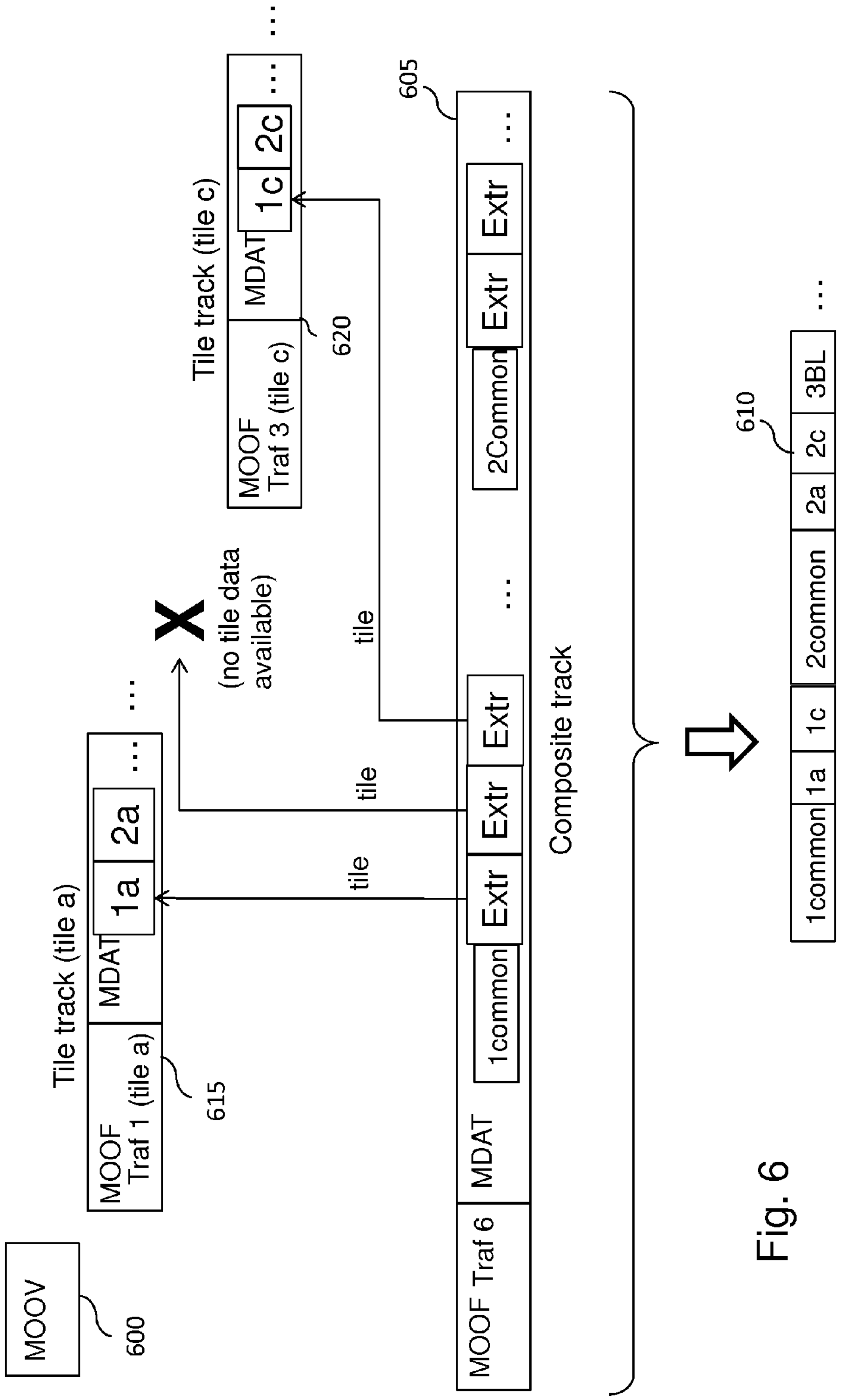
FIG. 6 illustrates an example of concatenating media data segments to build a valid decodable timed media data bit-stream representing a spatial part of consecutive video frames for a given temporal period.

FIG. 6 illustrates an example of concatenating media data segments to build a valid decodable timed media data bit-stream representing a spatial part of consecutive video frames for a given temporal period. The same figure could be repeated for other temporal periods.

As described above, a tiled timed media data bit-stream is preferably transmitted as a set of data comprising one initialization segment file and a plurality of media segment files, the latter comprising several tile tracks and one composite track.

The initialization segment file comprises a movie box 600 ("moov") that provides general information on each track, in particular the type of track (e.g. media track (audio or video) or tile track), a coding format, a frame resolution and the dependency among tracks (given in a track reference box "tref"). These data are used to process downloaded media segment files. The content of the movie box of the initialization segment file can comprise, in particular, the following:

MOOV
track 1: tile a
track 2: tile b
track 3: tile c
track 4: tile d
track 5: tile e
track 6: composite track FIG. 6 roughly illustrates the file format obtained by concatenating media segments when only required media segment files (corresponding here to tiles a and c) are downloaded from a server. It is to be noted that not only does such a mechanism allow downloading of only the required media segment files but it also prevents downloading of duplicate data, especially in case of scalable video stream where each tile depends on the whole base layer (as described with reference to FIG. 11*a*).

As illustrated, composite track 605 allows the building of a valid decodable timed media data bit-stream 610 by referencing data from tile track 615 and 620 and by handling appropriately extractors referencing missing data (e.g. extractor referencing data from tile track associated with tile b).

The obtained file format is compliant with scalable file format definition. For example, a client device can decide to play a region of interest corresponding to tile a and c by selecting this region. The client device can also change the tiles to be displayed by downloading different "tile tracks" (i.e. media segment files) in a later temporal period while it continues to play the composite track.

Valid timed media data bit-stream 610 is generated from concatenated media segments received by a client device, more precisely from selected tiles when the composite track is played by the client device.

After having received the media segment files that have been previously requested, comprising composite track 600, the latter is parsed to extract the first item of data (or the next item of data if at least one item of data of the received media segment has been processed, typically a NAL unit) from the media data box “mdat”.

Next, a test is performed to determine whether or not the extracted item of data (e.g. extracted NAL unit) corresponds to an extractor (EXT). If the extracted item of data does not correspond to an extractor, it is returned as is to be further decoded by a video decoder. On the contrary, if the extracted item of data is an extractor, it must be replaced by the item of data it is referencing. To that end, the values of the extractor’s parameters are obtained from its structure (an extractor comprises all the parameter values required to extract data from another track (e.g., parameters known as track_ref_index, sample_offset, data_offset, and data_length)).

Once the identifier of the referenced track has been identified, a test is performed to determine whether or not the referenced track is available in the buffered set of media segment files. It is to be recalled that some tile tracks are missing since the client device downloads only the media segment files corresponding to the selected Region-of-Interest.

If the referenced track is available in the buffered set of media segment files, the extractor is replaced by the data it is referencing and the bit-stream is sent to a video decoder to be decoded.

If the referenced track is not available in the buffered set of media segment files, specific steps have to be performed since the absence of data referenced in an extractor leads to a fatal error according to the ISO BMFF standard. A test is performed to determine whether or not the referenced track is a tile track (the referenced track can correspond to a dependent scalability layer) and whether or not the extractor is of the tile type.

If the referenced track is not a tile track or if the extractor is not of the tile type, a standard fatal error is detected. On the contrary, if the referenced track is a tile track and if the extractor is of the tile type, the extractor is removed or the extractor is replaced by padding from an alternative “padding track” or “padding box” containing ‘skipped’ data for the missing tiles, depending on the coding format used to encode the timed media data bit-stream. Here, ‘skipped’ data represent pixel data missing from a current image that are replaced by other pixel data obtained from a previously decoded image either belonging to a same scalable layer or belonging to another scalable layer. Skipped data are generally represented by at least one flag. For example, when considering HEVC video compression format, the padding data can be one or more NALUs that exclusively contain coding units encoded with a skip flag set to 1.

Next, the bit-stream is sent to a video decoder to be decoded and displayed and the process loops to handle a following item of data.

As described above, current manifests, in particular MPDs, do not allow the description of a video stream as a set of optional and switchable components. Moreover, according to the encapsulation scheme used to stream data, the only video track that can be displayed is the one resulting from the mp4 parsing of the composite track (i.e. resolution of the extractors). The tile tracks are not intended to be displayable by themselves. Accordingly, a manifest aims at describing a composite track as an addressable video representation. However, a composite track does not contain any data (except header information common to several tile tracks) since it is built with extractors pointing to tile tracks. This means that tile tracks also have to be described in the manifest and depending on tile selections by a client device, some of these tiles also have to be downloaded.

A possible way to describe optional components such as tile tracks of a media presentation (e.g. components that can be selected by a user) is based on the use of the structure known as SubRepresentation, as defined in DASH/MPD standard. This structure describes the properties of one or several components that are embedded in a representation.

Extract of code 3 given in the Appendix illustrates an example of a DASH manifest describing tile tracks as components of a video. For the sake of illustration, only one period is represented (tags <Period> . . . </Period>) but subsequent components would be similar. As represented, a first adaptation set (<AdaptationSet id=‘1’ . . . >) is used to describe a particular component consisting of a base layer track of the described scalable video that can be encoded according to SVC or HEVC scalable standard. The base layer is described as a single representation having identifier ‘R1 (<Representation id=‘R1’ . . . >). A second adaptation set (<AdaptationSet id=2’ . . . >) is used to describe the highest resolution layer of the scalable video.

It is to be noted that the manifest of a non-scalable video would contain a single adaptation set similar to the second represented one, without any dependency on a base layer (i.e. without any dependency identifier attribute).

In the second adaptation set, another single representation is described (<Representation id=‘R2’ . . . >): this is the one that corresponds to the displayable video. It is described as a list of segments (<segmentList> . . . </SegmentList>) with corresponding URL for client requests. As indicated with the parameter dependencyId, representation ‘R2’ depends on representation ‘R1’ (dependencyId=‘R1’), that is to say the base layer representation from the first adaptation set.

Such a dependency forces a client device to request first a current base layer segment before getting the corresponding current enhancement layer segment. This cannot be used to express dependencies with respect to tile tracks because the tracks that would be referenced this way would be automatically loaded by the client. This is something that is to be avoided since an object of embodiments of the invention is to let a user select tiles of interest (i.e. a region of interest) at any time during a media presentation.

Signaling dependencies between components, in particular between a composite track and tile tracks, is done through elements of the SubRepresentation type: a displayable video is represented as a list of sub-representations (<SubRepresentation . . . >. Each sub-representation represents a track in the encapsulated file (e.g. encapsulated mp4 file). Accordingly, one sub-representation is associated with each tile (four tiles Ta to Td in the example represented in extract of code 3 of the Appendix) and with the composite track (CT in the example represented in extract of code 3 of the Appendix).

Each sub-representation is described by a content component element (<ContentComponent . . . >) to indicate whether it corresponds to a tile track (<Role schemeIdUri=‘tiling’>) or to the composite track (<Role scherneldUri=‘role’>). This is expressed using the Role descriptor type available in DASH/MPD standard with a specific scheme for tiling description. This role also indicates the position of the tile in the full-frame video (<Role . . . value=‘x,y’>). For the sake of illustration, the tile content component having identifier ‘Ta’ describes the tile located at the top left of the video (1:1 for 1st in row and 1st in column).

The tile dimensions (width and height) are specified as attributes of the sub-representation as it is allowed by MPD.

It is to be noted that bandwidth values can also be indicated as sub-representation attributes to help a DASH client device in selecting alternate tiles versions according to a bandwidth criterion, for example when SNR scalability is available as described by reference to FIG. 12).

Composite tracks are signaled in a particular way so as to indicate that their downloading is mandatory (to be able to build a decodable video stream at the end of the download). To indicate such a feature, the descriptor in the related content component indicates that it is a main component among all the components (<Role . . . value='main'/>). Moreover, a new attribute 'required' is added in the corresponding sub-representation (<SubRepresentation . . . contentComponent='CT' required>) to indicate that the associated data have to be requested by a client device.

All requests for a composite track or for one or more tile tracks are computed from URLs provided in the segment list (<SegmentList>), one per time interval. According to the illustrated example (<SegmentURL media=« URL_X index_range=« 0-43 » />), URL URL_X is combined with base URL BaseURL as defined at the beginning of the MPD to define a complete URL based on which a client device can generate a request of the HTTP GET type. However, by doing so, a client device obtains data for the composite track as well as all the data for all the tile tracks. Accordingly, to optimize transmissions over the used communication network, a first request is directed to segment index information (referred to as sidx and ssix and described by reference to FIG. 7), using an index_range attribute of URLs (e.g. index_range=« 0-43 » ). Next, obtained segment index information is parsed in order to determine byte ranges for each of the components and to perform as many requests of the HTTP GET type with an appropriate byte range as there are selected tracks (including the required composite track).

Figure 7:
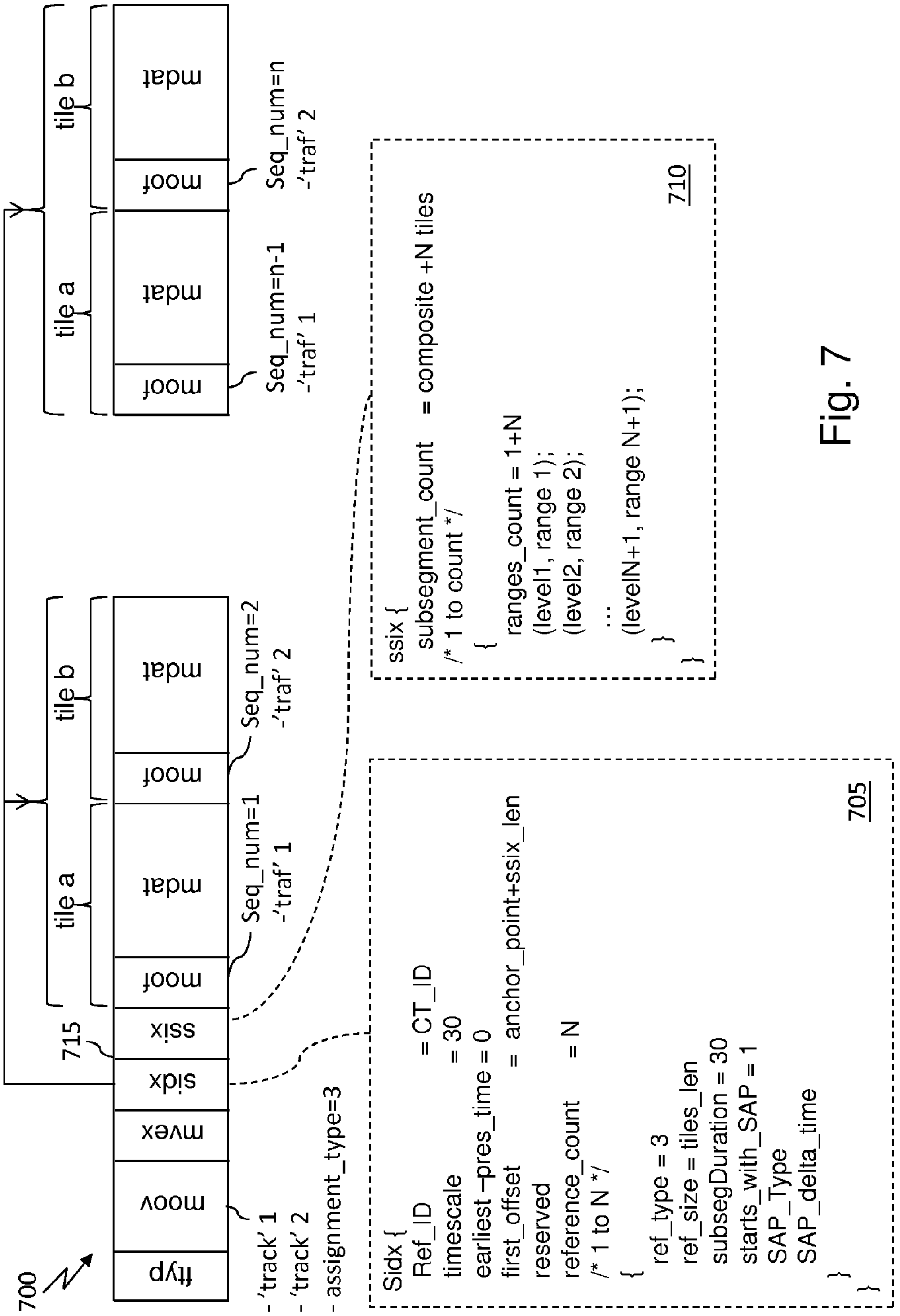
FIG. 7 illustrates an example of an mp4 organization that is suitable for using sub-representations for signaling tile tracks.

FIG. 7 illustrates an example of an mp4 organization that is suitable for using sub-representations for signaling tile tracks.

As illustrated, the encapsulated data 700 stream comprises boxes known as 'ftyp', 'moov', and 'mvex' as well as 'sidx' and 'ssix' boxes for storing initialization data.

'moov' box comprises, in particular, definition of the tracks.

Tile data are organized sequentially, one segment after another, each segment comprising data of each tile for the considered segment. Data are stored in 'mdat' boxes that are preceded by 'moof' boxes containing metadata specific initialization data.

As represented with references 705 and 710, the items of information stored in 'sidx' box define the beginning and the length, in bytes, of each segment (for all the tiles) and the items of information stored in 'ssix' box defines the length of each tile segment, respectively. An anchor point (715) is defined as being the beginning of 'ssix' box. Accordingly, segment data ('moof' and 'mdat' boxes) begin at the address defined by the anchor point to which is added the length of 'ssix' box.

According to this embodiment, existing elements of manifests are reused. Therefore, it requires minimal modifications in manifests. However, it requires client devices to be able to parse specific mp4 segment indexes (e.g. 'leva' parameter in the 'mvex' box and parameters of the sidx and ssix boxes) to be able to determine the byte ranges to use in order to address tile data. Moreover, it induces delay for segment index requests and parsing before being in position to request video data.

According to another embodiment for describing optional components of a media representation, the components are explicitly described as what they are: actually spatial parts or spatial sub-representations of the full-frame video.

An example of a manifest based on the DASH standard and to this embodiment is represented in the Appendix (Extract of code 4). For the sake of illustration, only one period is represented (tags <Period> . . . </Period>) but subsequent components would be similar.

According to the given example, the manifest comprises two representations for the given period, one for a particular component consisting of a base layer of a scalable video and another one for the enhancement layer of the same scalable video (components representing the spatial parts of the enhancement layer). This second representation depends on the first one due to scalable encoding (SVC, HEVC scalable, or any layered encoding). As represented, such a dependency is expressed through the dependencyId attribute (<Representation . . . id="EL1" dependencyId="BL1" . . . >).

In terms of dependency, the second representation also depends on its spatial parts which require a specific signalization. To that end, a new element is defined to characterize a "child" of a representation. Such a new element is referred to as a spatial sub-representation (<SpatialSubRepresentation . . . dependencyId=" " . . . >). One spatial sub-representation is used per tile track. Accordingly, since two tiles are considered in the described example, two spatial sub-representations are used.

Extract of code 6 given in the Appendix indicates the modification of the MPD XML schema to support this new element (<xs:element name="SubRepresentation" type="SubRepresentationType" minOccurs="0" maxOccurs="unbounded"/>) while extract of code 7 provides the XML schema for this new type of MPD element (<xs:complexType name="SpatialSubRepresentationType">).

Specifically, it contains two mandatory attributes (<xs:attribute name="posx" type="xs:unsignedInt" use="required"/> and <xs:attribute name="posy" type="xs:unsignedlnt" use="required"/>) to describe the positions of the spatial area represented by the spatial sub representation. It is to be noted that an XML schema description is used because the manifest is based on XML standard however, any structure description language can be used.

Compared to the embodiment described above, this one allows a direct addressing per tile through the segment list (<SegmentList . . . >) inside each spatial sub-representation.

This avoids, in particular, a client device being configured for parsing mp4 boxes.

The last segment list of the example given in extract of code 4 in the Appendix (<SegmentList duration="10"> <SegmentURL media="seg-EL1-1.mp4"/> <SegmentURL media="seg-EL1-2.mp4"/> </SegmentList>) for the second representation (<Representation mimeType="video/hevc" codecs="hvc1.4D401E" id="EL1" dependencyId="BL1" bandwidth="1024000" width="1920" height="1080">) corresponds to the URL to stream data of the composite track.

When parsing a spatial sub-representation in a representation of the video type, a client device has to consider it as an optional component of this representation.

Conversely, the segment list (or segment template or any means to address temporal segments) provided directly under the representation is to be downloaded in order to obtain, at the client end, a displayable video. The bandwidth associated to the Representation indicates the requested bandwidth for downloading all the tiles. For a bandwidth adaptation based on spatial selection, the bandwidth parameter of each spatial sub-representation can be considered.

It is to be noted that this embodiment supports tile-based scalability as described by reference to FIG. 11*b* since spatial sub-representations can use the conventional dependency mechanism (dependencyId) to reference lower scalability layers. This can be useful, in particular, to handle scalable video streams where tiling is available at each layer (and not only on the highest resolution level as in the given example illustrated in FIG. 11). It also has the benefit of being easily understandable: all tile information is directly available after parsing of the manifest (through various attributes). This information can be put in the manifest by server 200 by reading SEI messages contained in HEVC that describe the tiling configuration, especially the inter layer tile dependencies.

Moreover, using this description, it is possible to describe, for each tile alternate spatial sub-representation, in terms of tile size or in terms of bandwidth to provide finer adaptation possibilities for a client device. This can be useful for a configuration as the one illustrated in FIG. 12. Indeed, in case of SNR scalability, a user would have spatial access to a video at different qualities and could decide to switch dynamically from one quality level to another while keeping on the same spatial area.

This is illustrated in extract of code 5 given in the Appendix where only one AdaptationSet is described with two representations: one for the base layer and one for the SNR enhancement layer. Each layer has a set of spatial sub-representations. It is to be noted that inter-tile dependencies can be expressed in a finer way removing the global dependency from the enhancement layer to the base layer and specifying tile-based dependencies. Accordingly, when a user selects a set of tiles, only the corresponding tiles of the base layer are streamed, saving bandwidth resources. Moreover, such description provides finer adaptation by combining tiles at different qualities, considering their respective bandwidths. These SNR tiles (as illustrated in FIG. 12) can be described in only one representation that contains, for each tile position, alternate spatial sub-representations in terms of quality and related bandwidth (not represented in the illustrated example). Finally, such a description does not break the dynamic adaptation of DASH since it remains segment and representation based.

According to another embodiment, the description of optional components is made at segment level with reference to descriptors as represented in extract of code 8 in the Appendix Still for the sake of illustration, a scalable video having two layers is considered. Each layer is described in its own adaptation set: <AdaptationSet id='1' . . . >) for the base layer and (<AdaptationSet id='1' . . . >) for the enhancement layer, the latter corresponding to the video stream with spatial tiles. Only one representation is provided in this adaptation set, corresponding to a particular component consisting of the composite track. However, as described above, at least one tile track (optional component) has to be downloaded to allow the production of a displayable video.

As represented, the address (e.g. URLs) of the tile tracks are given in a list of URLs (<SegmentList> <SegmentURL media=«URL_CT» related=«URL_Ta URL_Tb URL_Tc URL_Td» type=«Ta Tb Tc Td» /> </SegmentList>) at the same level as the main URL for the composite track. While description parameters are associated with the URL of the composite track, this is not the case for the list of optional URLs. To describe these optional URLs, the list is followed by a list of references to descriptors (<ContentComponent id='Ta' . . . >, <ContentComponent id='Tb' . . . >, <ContentComponent id='Tc' . . . >, and <ContentComponent id='Td' . . . >) that provide information about each URL. In the example represented in extract of code 8, the descriptor is an element of the role type that is put in a content component element. There is one content component per tile track. The elements of the role type, used to provide information on each tile, are similar to the one described above. In addition to tile position, they could also contain the tile sizes and bandwidth information.

Extract of code 9 in the Appendix illustrates an example of extension of the Segment URL element (in XML schema) with optional attributes (<xs:attribute name="related" type="URLVectorType"/>, <xs:attribute name="relatedRange" type="StringVectorType"/>, and <xs:attribute name="type" type="StringVectorType"/>) that are put at the same level as the URL segment. To that end, a new type of parameter is defined to describe list of URLs (<xs:simpleType name="URLVectorType"> <xs:list itemType="xs:anyURI"/> </xs:simpleType>).

Figure 8:
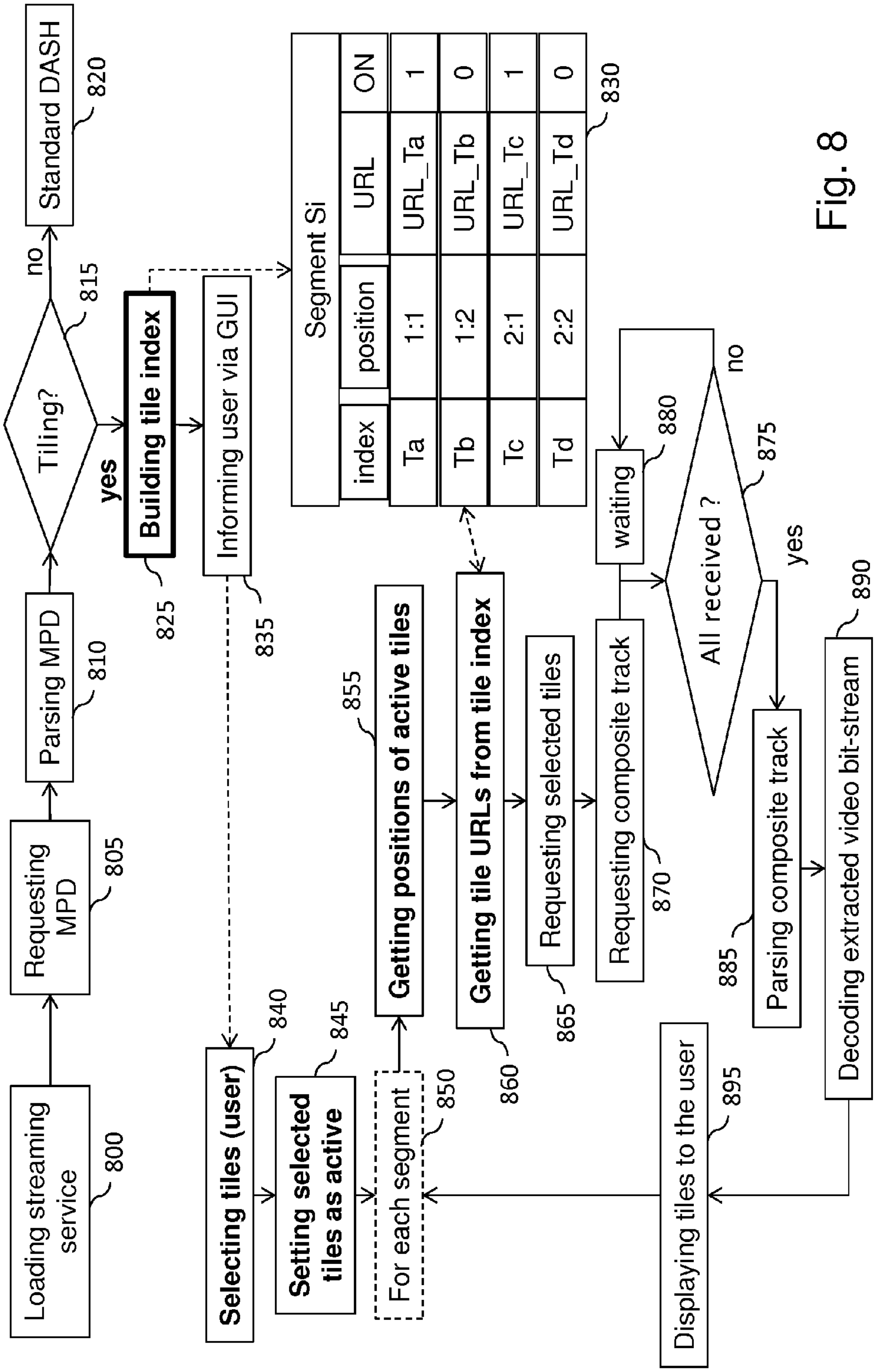
FIG. 8 is a flow chart illustrating processing steps carried out in a client device for processing a manifest comprising tile description according to the previous embodiment.

FIG. 8 is a flow chart illustrating processing steps carried out in a client device for processing a manifest comprising tile description according to the previous embodiment.

First illustrated steps 800 to 820 are standard steps according to DASH standard that mainly consist in loading and parsing the manifest (MPD) when no tiling information is present.

If tiling is detected at step 815, for example by detecting the presence of a role element comprising tiling schemeIdUri parameter value or by detecting the presence of spatial sub-representation elements in the manifest, a tile index table similar to the one illustrated with reference 830 is built (step 825) by parsing either the tiling descriptors or the spatial sub-representations. The tiling organization can be displayed to the user, for example as a grid overlaid on a video of which display is beginning (step 835).

Next, at any time during the streaming process, a user can select a set of one or several tiles he/she would like to focus on (step 840). The selected tiles are marked as active in the tile index table (step 845) so that the client device carrying out the algorithm knows that several requests have to be performed with corresponding URLs (stored in the third column of the index table 830).

An iterative process is then launched on each temporal segment of the presentation (step 850), that is to say on each period, during which the position of each active tile is read from the tile index table along with the associated URL (steps 855 and 860). The obtained URLs are submitted to the streaming server in requests (step 865) to receive the active tile tracks. Similarly, the URL of the composite track of the current temporal segment is submitted to the streaming server (step 870). When all the active tile tracks and composite track are received, the client device is in a position to parse the composite track (reconstituted mp4 composite track) and to access data from tile tracks in order to build a standard decodable bit-stream (step 885) that can be decoded (step 890) and displayed (step 895).

In case all segment data are not received, the client device waits for the tile tracks and composite track (steps 875 and 880). This is to be sure to not miss an extractor resolution on a selected tile for which data would not have been received yet.

Figure 9:
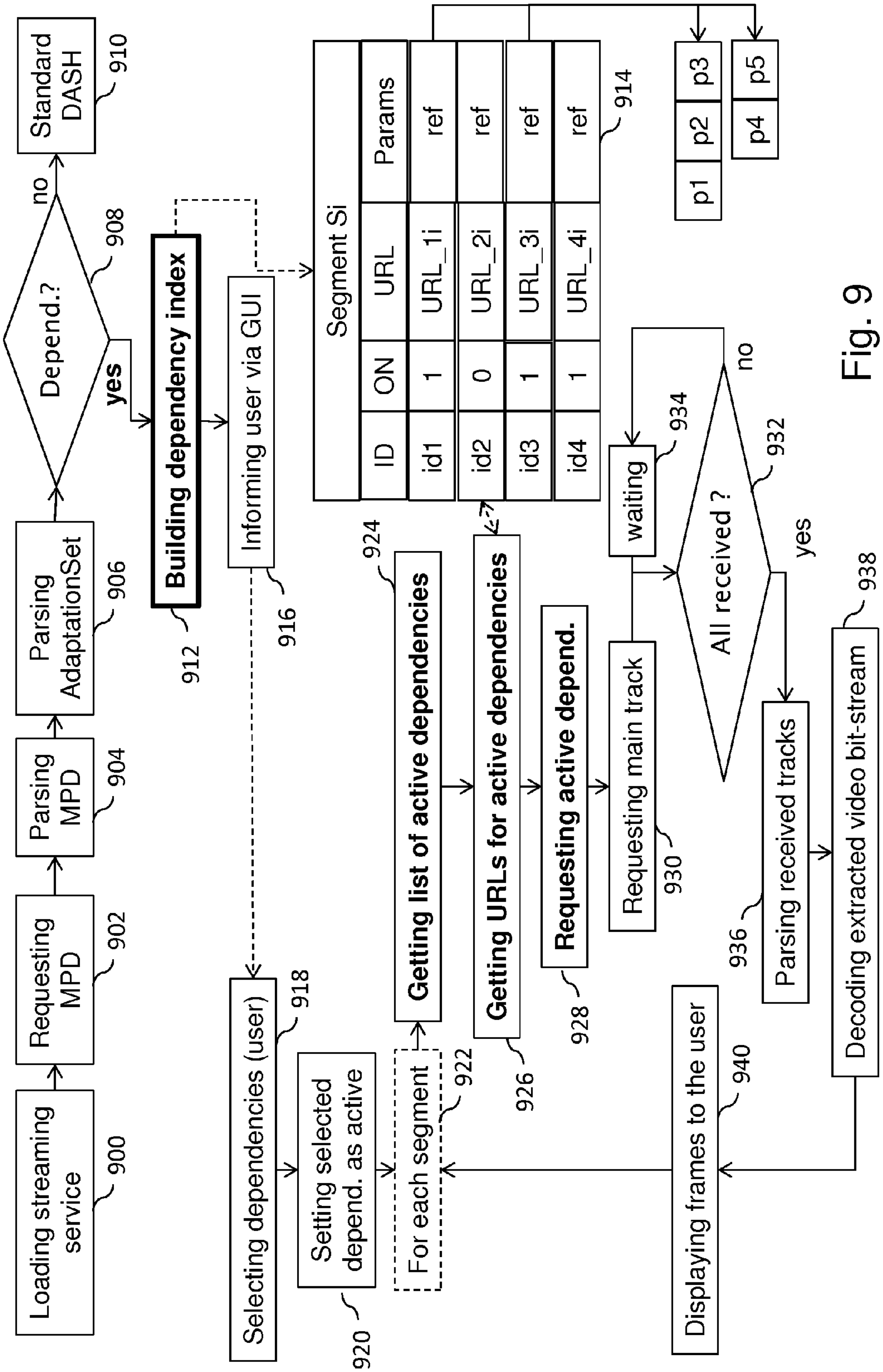
FIG. 9 is a flow chart illustrating processing steps carried out in a client device for processing a manifest comprising dependency description according to the previous embodiment.

As illustrated in FIG. 9, such a process can be generalized for any descriptor (not specifically tile descriptor as described by reference to FIG. 8). As represented, one difference with the algorithm represented in FIG. 8 lies in the index but the processing steps are similar to the one described by reference to that Figure.

FIG. 9 is a flow chart illustrating processing steps carried out in a client device for processing a manifest comprising dependency description according to the previous embodiment.

Accordingly, first illustrated steps 900 to 910 are standard steps according to DASH standard that mainly consist in loading and parsing the manifest (MPD) when no dependency information is present.

If dependencies are detected at step 908, for example by detecting the presence of a role element comprising dependency schemeIdUri parameter value or by detecting the presence of spatial sub-representation elements in the manifest, an index table similar to the one illustrated with reference 914 is built (step 912) by parsing either the descriptors or the spatial sub-representations. The dependency organization is advantageously displayed to the user so that he/she can choose one or several dependencies to be displayed (step 916).

Next, at any time during the streaming process, a user can select a set of one or several dependencies he/she would like to be used by the decoding process (step 918). The selected dependencies are marked as active in the index table (step 920) so that the client device carrying out the algorithm knows that several requests have to be performed with corresponding URLs (stored in the third column of the index table 914).

An iterative process is then launched on each temporal segment of the presentation (step 922), that is to say on each period, during which the list of active dependencies to be used by the decoding process is read from the index table along with the associated URL (steps 924 and 926). The obtained URLs are submitted to the streaming server in requests (step 928) to receive the active dependency tracks. Similarly, the URL of the main track of the current temporal segment is submitted to the streaming server (step 930). When all the active dependency tracks and main track have been received, the client device is in a position to parse the main track and to access data from dependency tracks in order to build a standard decodable bit-stream (step 936) that can be decoded (step 938) and displayed (step 940).

In case data has not been received from all segments, the client device waits for the dependency tracks and main track (steps 932 and 934). This is to be sure to not miss an extractor resolution on a selected dependency for which data would not have been received yet.

Such an approach has the benefit of limiting syntax extension (no new element is introduced). Moreover, it provides a generic scheme for any optional content signaling at segment level, thus preserving segment based approach and switches for dynamic adaptation.

A variant of this embodiment would be to refer to descriptors in another adaptation set instead of content components inside the current adaptation set. This would be relevant in case of tile tracks encapsulated as displayable track while keeping on providing the combination of any tiles via a composite track referring to these displayable tile tracks.

Figure 10:
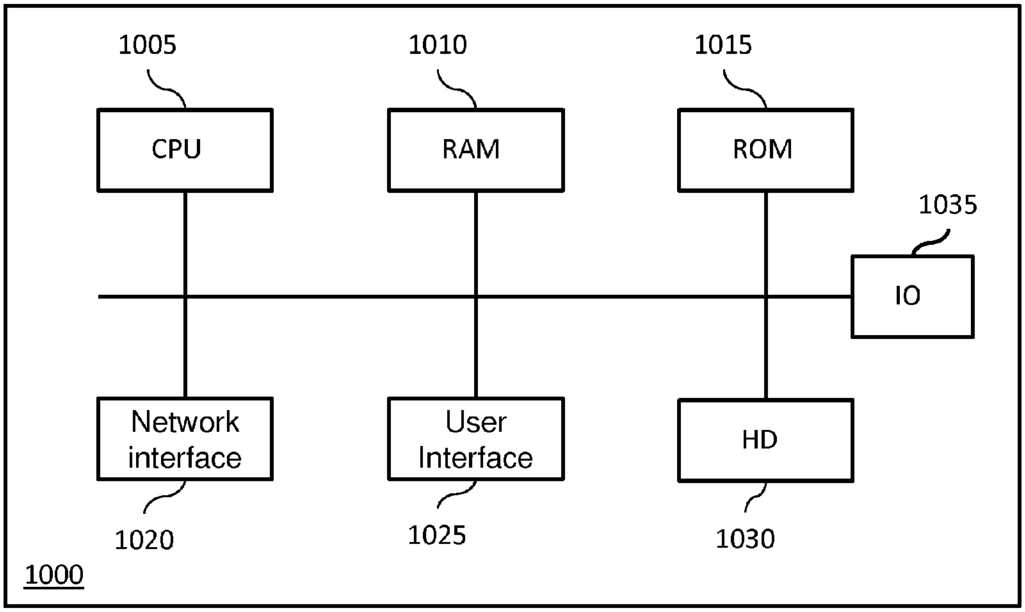
FIG. 10 is a schematic block diagram of a computing device that can be used for carrying each or some steps of each of the described embodiments of the invention.

FIG. 10 is a schematic block diagram of a computing device 1000 that can be used for carrying each or some steps of each of the described embodiments of the invention. Computing device 1000 may be a device such as a micro-computer, a workstation, or a light portable device.

Computing device 1000 comprises a communication bus connected to:

- a central processing unit 1005, such as a microprocessor, denoted CPU;
- a random access memory 1010, denoted RAM, for storing the executable code of the method of embodiments of the invention as well as registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory 1015, denoted ROM, for storing computer programs for implementing embodiments of the invention;
- a network interface 1020 is typically connected to a communication network over which digital data to be processed are transmitted or received. The network interface 1020 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1005;
- a user interface 1025 for receiving inputs from a user or to display information to a user;
- a hard-disk 1030 denoted HD; and
- an I/O module 1035 for receiving/sending data from/to external devices such as a video source or display.

The executable code may be stored either in read only memory 1015, on the hard-disk 1030, or on a removable digital medium such as for example a disk. According to a variant, the executable code of the programs can be received by means of a communication network, via the network interface 1020, in order to be stored in one of the storage means of the communication device 1000, such as the hard disk 1030, before being executed.

The central processing unit 1005 is adapted to control and direct the execution of the instructions or portions of software code of the program or programs according to embodiments of the invention, which instructions are stored in one of the aforementioned storage means. After powering on, the CPU 1005 is capable of executing instructions from main RAM memory 1010 relating to a software application after those instructions have been loaded from the program ROM 1015 or the hard-disc 1030 for example. Such a software application, when executed by the CPU 1005, causes steps of the algorithms described previously to be performed.

In this embodiment, the apparatus is a programmable apparatus which uses software to implement the invention. However, alternatively, embodiments of the present invention may be implemented in hardware (for example, in the form of an Application Specific Integrated Circuit or ASIC).

Embodiments of the invention may be embedded in a device like a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building put under surveillance provided that the surveillance camera supports the generation part of this invention.

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

APPENDIX

```
File name = Movie_4.mf
Type of segmentation = spatially
Number of segments = 4
Relationships between segments = 2x2 matrix
Segment
    Segment name = cache.source.com/res/Movie-4-1.seg
    Position in whole = (0, 0)
Segment
    Segment name = cache.source.com/res/Movie-4-2.seg
    Position in whole = (0, 1)
Segment
    Segment name = cache.source.com/res/Movie-4-3.seg
    Position in whole = (1, 0)
Segment
    Segment name = cache.source.com/res/Movie-4-4.seg
    Position in whole = (1, 1)
```

Extract of Code 1: Manifest File

```
<?xml version=“1.0”?>
    <MPD xmlns:xsi=“http://www.w3.org/2001/XMLSchema-instance”
    xmlns=“urn:mpeg:DASH:schema:MPD:2011”
    xsi:schemaLocation=“urn:mpeg:DASH:schema:MPD:2011 DASH-MPD.xsd”
    type=“static”
    mediaPresentationDuration=“PT3256S”
    minBufferTime=“PT1.2S”
    profiles=“urn:mpeg:dash:profile:isoff-on-demand:2011”>
    <BaseURL>http://cdn1.example.com/</BaseURL>
    <BaseURL>http://cdn2.example.com/</BaseURL>
    <Period>
<!-- English Audio -->
    <AdaptationSet mimeType=“audio/mp4” codecs=“mp4a.0x40” lang=“en”
    subsegmentAlignment=“true” subsegmentStartsWithSAP=“1”>
    <ContentProtection schemeIdUri=“urn:uuid:706D6953-656C-5244-4D48-656164657221”/>
        <Representation id=“1” bandwidth=“64000”>
            <BaseURL>7657412348.mp4</BaseURL>
        </Representation>
        <Representation id=“2” bandwidth=“32000”>
            <BaseURL>3463646346.mp4</BaseURL>
        </Representation>
<!-- Video -->
        <AdaptationSet mimeType=“video/mp4” codecs=“avc1.4d0228”
        subsegmentAlignment=“true” subsegmentStartsWithSAP=“2”>
        <ContentProtection schemeIdUri=“urn:uuid:706D6953-656C-5244-4D48-56164657221”/>
            <Representation id=“6” bandwidth=“256000” width=“320” height=“240”>
                <BaseURL>8563456473.mp4</BaseURL>
            </Representation>
            <Representation id=“7” bandwidth=“512000” width=“320” height=“240”>
                <BaseURL>56363634.mp4</BaseURL>
            </Representation>
            <Representation id=“8” bandwidth=“1024000” width=“640” height=“480”>
                <BaseURL>562465736.mp4</BaseURL>
            </Representation>
            <Representation id=“9” bandwidth=“1384000” width=“640” height=“480”>
                <BaseURL>41325645.mp4</BaseURL>
            </Representation>
            <Representation id=“A” bandwidth=“1536000” width=“1280” height=“720”>
                <BaseURL>89045625.mp4</BaseURL>
            </Representation>
            <Representation id=“B” bandwidth=“2048000” width=“1280” height=“720”>
                <BaseURL>23536745734.mp4</BaseURL>
            </Representation>
        </AdaptationSet>
    </Period>
</MPD>
```

Extract of Code 2: Manifest File

```
<MPD ...>
    <Period>
        <BaseURL>http://myserver.com/media</BaseURL>
        <SegmentList>
            <Initialization sourceURL=« URL_SI» />
        </SegmentList>
        <AdaptationSet id='1' contentType='video' framerate='30'>
            <!-- Base layer description -->
          <Representation id='R1' mimeType='video/mp4' width='2000' height='1000'
          bandwidth='512000'>
          <SegmentList> <SegmentURL media=« URL_BL» />    </SegmentList>
            </Representation>
        </AdaptationSet>
        <!-- Enhancement layer description, composite track -->
            <AdaptationSet id='2' contentType='video' framerate='30'>
            <!- Tile a, b, c and d are described as components of composite track -->
            <ContentComponent id='Ta'/><Role schemeIdUri='tiling'
            value='1:1'/></ContentComponent>
            <ContentComponent id='Tb'/><Role schemeIdUri='tiling'
            value='1:2'/></ContentComponent>
            <ContentComponent id='Tc'/> <Role schemeIdUri='tiling'
            value='2:1'/></ContentComponent>
            <ContentComponent id='Td'/> <Role schemeIdUri='tiling'
            value='2:2'/></ContentComponent>
            <ContentComponent id='CT'/> <Role schemeIdUri='...role'
            value='main'/></ContentComponent>
            <Representation id='R2' mimeType='video/mp4' dependencyId='R1'
            width='4000'
            height='2000' bandwidth='2048000'>
                <SubRepresentation level='1' contentComponent='Ta' width='2000'
                height='1000'/>
                <SubRepresentation level='2' contentComponent='Tb' width='2000'
                height='1000'/>
                <SubRepresentation level='3' contentComponent='Tc' width='2000'
                height='1000'/>
                <SubRepresentation level='4' contentComponent='Td' width='2000'
                height='1000'/>
                <SubRepresentation level='5' contentComponent='CT' required/>
                <SegmentList>
                    <SegmentURL media=« URL_X index_range=« 0-43»» />
                    ....
                </SegmentList>
            </Representation>
        </AdaptationSet>
    </Period>
</MPD>
```

Extract of Code 3: Manifest File Comprising Sub-Representation Structures

```
<Period>
    <SegmentList> <Initialization sourceURL="seg-m-init.mp4"/> </SegmentList>
    <AdaptationSet subsegmentAlignment="true" subsegmentStartsWithSAP="2"
    minBandwidth="512000" maxBandwidth="1024000" frameRate="30" >
        <Representation mimeType="video/hevc" codecs="hvc1.4D401E" id="BL1"
        bandwidth="512000" width="640" height="480">
            <SegmentList duration="10">
                <SegmentURL media="seg-BL-1.mp4"/>
                <SegmentURL media="seg-BL-2.mp4"/>
            </SegmentList>
        </Representation>
        <Representation mimeType="video/hevc" codecs="hvc1.4D401E" id="EL1"
        dependencyId = "BL1" bandwidth="1024000" width="1280" height="1080">
            <SpatialSubRepresentation id="tileA" dependencyId=" " posx="0" posy="0"
            width="640" height="480" bandwidth="512000">
                <SegmentList duration="10">
                    <SegmentURL media="seg-EL1-tileA-1.mp4"/>
                    <SegmentURL media="seg-EL1-tileA-2.mp4"/>
                </SegmentList>
            </SpatialSubRepresentation>
            <SpatialSubRepresentation id="tileB" dependencyId=" " posx="640" posy="0"
            width="640" height="480" bandwidth="512000">
                <SegmentList duration="10">
                    <SegmentURL media="seg-EL1-tileB-1.mp4"/>
                    <SegmentURL media="seg-EL1-tileB-2.mp4"/>
                </SegmentList>
```

-continued

```
            </SpatialSubRepresentation>
            <SegmentList duration="10">
                <SegmentURL media="seg-EL1-1.mp4"/>
                <SegmentURL media="seg-EL1-2.mp4"/>
            </SegmentList>
        </Representation>
    </AdaptationSet>
</Period>
```

Extract of Code 4: Manifest File Comprising Specific Sub-Representation Structures

```
<Period>
    <SegmentList> <Initialization sourceURL="seg-m-init.mp4"/> </SegmentList>
    <AdaptationSet subsegmentAlignment="true" subsegmentStartsWithSAP="2"
    minBandwidth="512000" maxBandwidth="1024000" frameRate="30" >
        <Representation mimeType="video/hevc" codecs="hvc1.4D401E" id="BL1"
        bandwidth="512000" width="1280" height="1080">
            <SpatialSubRepresentation id="tileA_0" posx="0" posy="0" width="640"
            height="480">
                <SegmentList duration="10">
                    <SegmentURL media="seg-EL1-tileA-01.mp4"/>
                    <SegmentURL media="seg-EL1-tileA-02.mp4"/>
                </SegmentList>
            </SpatialSubRepresentation>
            <SpatialSubRepresentation id="tileB_0" posx="640" posy="0" width="640"
            height="480">
                <SegmentList duration="10">
                    <SegmentURL media="seg-EL1-tileB-01.mp4"/>
                    <SegmentURL media="seg-EL1-tileB-02.mp4"/>
                </SegmentList>
            </SpatialSubRepresentation>
            <!—Composite track for base layer -->
            <SegmentList duration="10">
                <SegmentURL media="seg-BL-1.mp4"/>
                <SegmentURL media="seg-BL-2.mp4"/>
            </SegmentList>
        </Representation>
        <Representation mimeType="video/hevc" codecs="hvc1.4D401E" id="EL1"
        bandwidth="1024000" width="1280" height="1080">
            <SpatialSubRepresentation id="tileA_1" dependencyId="tileA_0" posx="0" posy="0"
            width="640" height="480" bandwidth="512000">
                <SegmentList duration="10">
                    <SegmentURL media="seg-EL1-tileA-11.mp4"/>
                    <SegmentURL media="seg-EL1-tileA-12.mp4"/>
                </SegmentList>
            </SpatialSubRepresentation>
            <SpatialSubRepresentation id="tileB_1" dependencyId="tileB_0" posx="640"
            posy="0"
            width="640" height="480" bandwidth="512000">
                <SegmentList duration="10">
                    <SegmentURL media="seg-EL1-tileB-11.mp4"/>
                    <SegmentURL media="seg-EL1-tileB-12.mp4"/>
                </SegmentList>
            </SpatialSubRepresentation>
            <!—Composite track for SNR enhancement layer -->
            <SegmentList duration="10">
                <SegmentURL media="seg-EL1-1.mp4"/>
                <SegmentURL media="seg-EL1-2.mp4"/>
            </SegmentList>
        </Representation>
    </AdaptationSet>
</Period>
```

Extract of Code 5: Manifest File Comprising Specific Sub-Representation Structures

```
<!- Modification of the Representation type -->
<xs:complexType name="RepresentationType">
    <xs:complexContent>
        <xs:extension base="RepresentationBaseType">
            <xs:sequence>
                <xs:element name="BaseURL" type="BaseURLType" minOccurs="0"
```

-continued

```
                    maxOccurs="unbounded"/>
                    <xs:element name="SpatialSubRepresentation"
                    type="SpatialSubRepresentationType" minOccurs="0" maxOccurs="unbounded"/>
                    <xs:element name="SubRepresentation" type="SubRepresentationType"
                    minOccurs="0" maxOccurs="unbounded"/>
                    <xs:element name="SegmentBase" type="SegmentBaseType" minOccurs="0"/>
                    <xs:element name="SegmentList" type="SegmentListType" minOccurs="0"/>
                    <xs:element name="SegmentTemplate " type="SegmentTemplateType"
                    minOccurs="0"/>
               </xs:sequence>
               <xs:attribute name="id" type="StringNoWhitespaceType" use="required"/>
               <xs:attribute name="bandwidth" type="xs.unsignedInt" use="required"/>
               <xs:attribute name="qualityRanking" type="xs:unsignedInt"/>
               <xs:attribute name="dependencyId" type="StringVectorType"/>
               <xs:attribute name="mediaStreamStructureId" type="StringVectorType"/>
          </xs:extension>
     </xs:complexContent>
</xs:complexType>
```

Extract of Code 6: Modification of the MPD Representation Element

```
<!- Definition of the SpatialSubRepresentation element -->
<xs:complexType name="SpatialSubRepresentationType">
     <xs:complexContent>
          <xs:extension base="RepresentationBaseType">
               <xs:sequence>
                    <xs:element name="BaseURL" type="BaseURLType" minOccurs="0"
                    maxOccurs="unbounded"/>
                    <xs:element name="SegmentBase" type="SegmentBaseType" minOccurs="0"/>
                    <xs:element name="SegmentList" type="SegmentListType" minOccurs="0"/>
                    <xs:element name="SegmentTemplate" type="SegmentTemplateType"
                    minOccurs="0"/>
               </xs:sequence>
               <xs:attribute name="id" type="StringNoWhitespaceType" />
               <xs:attribute name="dependencyId" type=" StringVectorType "/>
               <xs:attribute name="posx" type="xs:unsignedInt" use="required"/>
               <xs:attribute name="posy" type="xs:unsignedInt" use="required"/>
               <xs:attribute name="bandwidth" type="xs:unsignedInt"/>
               <xs:attribute name="contentComponent" type="StringVectorType"/>
          </xs:extension>
     </xs:complexContent>
</xs:complexType>
```

Extract of Code 7: Definition of a Spatial Sub-Representation for MPD

```
<MPD ...>
     <Period>
          <BaseURL>http://myserver.com/media</BaseURL>
          <SegmentList>
               <Initialization sourceURL=«URL_SI» />
          </SegmentList>
          <AdaptationSet id='1' contentType='video' framerate='30'>
               <!-- Base layer description -->
               <Representation id='R1' mimeType='video/mp4' width='2000' height='1000'
               bandwidth='512000'>
                    <SegmentList> <SegmentURL media=«URL_BL» /> </SegmentList>
               </Representation>
          </AdaptationSet>
          <!-- Enhancement layer description, composite track -->
          <AdaptationSet id='2' contentType='video' framerate='30' width='4000'
          height='2000' >
               <!- Tile a, b, c and d appear as components of composite track -->
               <ContentComponent id='Ta' />< Role schemeIdUri='tiling' id='1'
               value='1:1'/></ContentComponent>
               <ContentComponent id='Tb' /><Role schemeIdUri='tiling' id='1'
               value='1:2'/></ContentComponent>
               <ContentComponent id='Tc' /><Role schemeIdUri='tiling' id='1'
               value='2:1'/></Content Component>
               <ContentComponent id='Td '/><Role schemeIdUri='tiling' id='1'
               value='2:2'/></ContentComponent>
               <Representation id='R2' mimeType='video/mp4' dependencyId='R1'
```

-continued

```
            bandwidth='2048000' width='4000' height='2000'>
                <SegmentList>
                    <SegmentURL media=«URL_CT»
                    related=«URL_Ta URL_Tb URL_Tc URL_Td» type=«Ta Tb Tc Td» />
                </SegmentList>
            </Representation>
        </AdaptationSet>
    </Period>
</MPD>
```

Extract of Code 8: Segment-Based Tile Signaling for MPD

```
<!-- SegmentURL-->
<xs:complexType name="SegmentURLType">
    <xs:sequence>
        <xs:any namespace="##other" processContents="lax" minOccurs="0"
        maxOccurs="unbounded"/>
    </xs:sequence>
    <xs:attribute name="media" type="xs:anyURI"/>
    <xs:attribute name="mediaRange" type="xs:string"/>
    <xs:attribute name="index" type="xs:anyURI"/>
    <xs:attribute name="indexRange" type="xs:string"/>
    <xs:attribute name="related" type="URLVectorType"/>
    <xs:attribute name="relatedRange" type="StringVectorType"/>
    <xs:attribute name="type" type="StringVectorType"/>    <!-- Actually descriptors IDs -->
    <xs:anyAttribute namespace="##other" processContents="lax"/>
</xs:complexType>
<!- List of URLs (added) -->
<xs:simpleType name="URLVectorType">
    <xs:list itemType="xs:anyURI"/>
</xs:simpleType>
```

Extract of Code 9: Extension of the MPD SegmentURL Type

The invention claimed is:

1. A method for receiving streamed timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the method comprising:

receiving a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data;

selecting at least one optional component that can be selected to reconstruct at least a portion of the partitioned timed media data;

requesting the at least one component that is required to reconstruct at least partially the partitioned timed media data and the at least one selected optional component that can be selected to reconstruct at least a portion of the partitioned timed media data; and on reception of the requested components:

parsing the at least one component that is required to reconstruct at least partially the partitioned timed media data; and generating a playable media representation bit-stream from the parsed at least one component, the playable media representation bit-stream being generated as a function of media data of the at least one selected optional component determined as a function of the parsed data of the at least one component that is required to reconstruct at least partially the partitioned timed media data.

2. The method of claim 1 further comprising parsing and analyzing the manifest for establishing a dependency relation between the at least one selected optional component that can be selected to reconstruct at least a portion of the partitioned timed media data and the at least one component that is required to reconstruct at least partially the partitioned timed media data.

3. The method of claim 2 wherein the step of requesting the at least one selected optional component that can be selected to reconstruct at least a portion of the partitioned timed media data comprises the steps of:

requesting parameter values, receiving requested parameter values, and requesting the at least one selected optional component that can be selected to reconstruct at least a portion of the partitioned timed media data as a function of the received requested parameter values in particular.

4. The method of claim 3, wherein the parameter values comprise a position of subsamples in the timed samples.

5. The method of claim 1, wherein the partitioned timed media data are tiled timed media data, wherein the timed media data are transmitted as at least one media segment file comprising independently encapsulated tracks comprising at least one tile track containing a subsample selected from among the plurality of subsamples of one of the timed samples and one corresponding subsample of each of the other timed samples and at least one composite track comprising at least one extractor identifying at least one tile track, and wherein:

the received manifest describes a plurality of versions of the tiled timed media data, the manifest comprising representations, each representation comprising at least a description of a version of a portion of the tiled timed media data, at least one said representation comprising a description of a plurality of tracks among which are at least one composite track and at least one tile track;

each of the at least one selected optional component is a tile track;

each of the at least one requested component that is required to reconstruct at least partially the partitioned timed media data is a requested composite track and each of the at least one requested selected optional component that can be selected to reconstruct at least a portion of the partitioned timed media data is a requested selected tile track; and on reception of the requested tracks, the playable media representation bit-stream is generated from the received tracks.

6. The method of claim 5 further comprising parsing and analyzing the manifest for establishing a dependency relation between the at least one selected tile track and the at least one composite track.

7. The method of claim 6 wherein the step of requesting the at least one selected tile track comprises the steps of:

requesting parameter values, receiving requested parameter values, and requesting the at least one selected tile track as a function of the received requested parameter values in particular.

8. A non-transitory computer-readable storage medium storing instructions of a computer program for implementing the method according to claim 1.

9. A device for receiving streamed timed media data organized into temporal media segments, the timed media data belonging to partitioned timed media data comprising timed samples, each timed sample comprising a plurality of subsamples, the timed media data being transmitted as at least one media segment file comprising independently encapsulated components comprising at least one partition component containing a subsample selected from among the plurality of subsamples of one of the timed samples and one corresponding subsample of each of the other timed samples and at least one reference component comprising at least one extractor identifying at least one partition component, the device comprising at least one microprocessor configured for carrying out the steps of:

receiving a manifest describing a plurality of versions of the partitioned timed media data, the manifest comprising representations, each representation comprising at least a description of a version of a portion of the partitioned timed media data, at least one said representation comprising a description of a plurality of components among which at least one component is required to reconstruct at least partially the partitioned timed media data and among which at least one component is an optional component that can be selected to reconstruct at least a portion of the partitioned timed media data;

selecting at least one optional component that can be selected to reconstruct at least a portion of the partitioned timed media data;

requesting the at least one component that is required to reconstruct at least partially the partitioned timed media data and the at least one selected optional component that can be selected to reconstruct at least a portion of the partitioned timed media data; and on reception of the requested components:

parsing the at least one component that is required to reconstruct at least partially the partitioned timed media data; and generating a playable media representation bit-stream from the parsed at least one component, the playable media representation bit-stream being generated as a function of media data of the at least one selected optional component determined as a function of the parsed data of the at least one component that is required to reconstruct at least partially the partitioned timed media data.

10. The device of claim 9, wherein the partitioned timed media data are tiled timed media data, wherein the timed media data are transmitted as at least one media segment file comprising independently encapsulated tracks comprising at least one tile track containing a subsample selected from among the plurality of subsamples of one of the timed samples and one corresponding subsample of each of the other timed samples and at least one composite track comprising at least one extractor identifying at least one tile track, and wherein:

the received manifest describes a plurality of versions of the tiled timed media data, the manifest comprising representations, each representation comprising at least a description of a version of a portion of the tiled timed media data, at least one said representation comprising a description of a plurality of tracks among which are at least one composite track and at least one tile track;

each of the at least one selected optional component is a tile track;

each of the at least one requested component that is required to reconstruct at least partially the partitioned timed media data is a requested composite track and each of the at least one requested selected optional component that can be selected to reconstruct at least a portion of the partitioned timed media data is a requested selected tile track; and on reception of the requested tracks, the playable media representation bit-stream is generated from the received tracks.

* * * * *